United States Patent
Hanf et al.

[19]

[11] Patent Number: 6,115,831
[45] Date of Patent: *Sep. 5, 2000

[54] INTEGRATED CIRCUIT FOR COUPLING A MICROCONTROLLED CONTROL APPARATUS TO A TWO-WIRE BUS

[75] Inventors: Peter Hanf, Göppingen; Jürgen Minuth, Eislingen; Jürgen Setzer, Illingen, all of Germany

[73] Assignee: DaimlerChrysler AG, Stuttgart, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/825,028

[22] Filed: Mar. 26, 1997

[30] Foreign Application Priority Data

Mar. 26, 1996 [DE] Germany .......................... 196 11 944

[51] Int. Cl.⁷ .............................. G06F 11/00; G06F 13/42
[52] U.S. Cl. ................................ 714/43; 714/56; 710/128
[58] Field of Search ......................... 395/183.19, 185.09, 395/182.01, 182.02; 709/230, 239; 710/105, 128

[56] References Cited

U.S. PATENT DOCUMENTS

| | | | |
|---|---|---|---|
| 5,111,460 | 5/1992 | Botzenhardt et al. | 395/182.02 |
| 5,196,728 | 3/1993 | Jaux | 307/10.1 |
| 5,216,674 | 6/1993 | Peter et al. | 395/183.19 |
| 5,267,251 | 11/1993 | Lenoir et al. | 395/183.19 |
| 5,357,518 | 10/1994 | Peter | 395/182.02 |
| 5,375,056 | 12/1994 | Nitschke et al. | 364/424.03 |
| 5,444,626 | 8/1995 | Schenk | 364/431.04 |
| 5,452,308 | 9/1995 | Kaminski et al. | 395/183.19 |
| 5,483,639 | 1/1996 | Haeussler et al. | 395/185.09 |
| 5,499,336 | 3/1996 | Preis et al. | 395/182.02 |
| 5,572,658 | 11/1996 | Mohr et al. | 395/182.02 |
| 5,600,782 | 2/1997 | Thomson | 395/182.02 |
| 5,765,031 | 6/1998 | Mimuth et al. | 395/183.19 |
| 5,781,585 | 7/1998 | Dorner et al. | 375/224 |

FOREIGN PATENT DOCUMENTS

| | | | |
|---|---|---|---|
| 38 07 566 A1 | of 1989 | Germany | H04L 1/20 |
| 41 12 665 A1 | of 1992 | Germany | B60R 16/02 |
| 41 26 449 A1 | of 1992 | Germany | B60R 16/02 |
| 41 36 338 A1 | of 1993 | Germany | G05B 9/03 |
| 42 11 579 C1 | of 1993 | Germany | H04L 1/24 |
| 43 44 238 A1 | of 1994 | Germany | H04L 12/40 |
| WO 93/22857 | of 1993 | WIPO | H04L 12/40 |

*Primary Examiner*—Robert W. Beausoliel, Jr.
*Assistant Examiner*—Scott T. Baderman
*Attorney, Agent, or Firm*—Evenson, McKeown, Edwards & Lenahan, P.L.L.C.

[57] ABSTRACT

An integrated semiconductor circuit for an electronic control unit has a microcontroller with a bus protocol function for communicating with other microcontrolled control units via a Controller Area Network (CAN) by way of a two-wire bus. The invention includes a bus-fault-tolerant transceive function which permits communication even when a bus fault is present. A bus fault recognition and response device disconnects the bus from its normal connections and alters its termination characteristics when a fault is detected.

44 Claims, 11 Drawing Sheets

INTEGRATED CIRCUIT FOR COUPLING A MICROCONTROLLED CONTROL APPARATUS TO A TWO-WIRE BUS

This application claims the priority of German priority document 196 11 944.8, the disclosure of which is expressly incorporated by reference herein.

BACKGROUND AND SUMMARY OF THE INVENTION

The invention relates to an integrated circuit for coupling a microcontrolled control apparatus to a two-wire bus to communicate with other such microcontrolled devices.

The growing number of CAN-bus-networked electronic systems in industrial facilities and transport devices, such as motor vehicles, has created a demand for coupling devices for mutually connecting the microcontrollers by way of a two-wire bus network. More or less discrete solutions have been developed for this purpose which, however, have not been found to be universally usable. In particular, they do not (or do not sufficiently rapidly) make or keep the bus network available when a capital fault occurs in the bus medium. On the other hand, bus faults may lead to increased current consumption of the overall network by way of the bus. As a result, for example where the network is supplied by a battery, the availability of the system is impaired indirectly.

On the other hand, such known coupling devices lack network-availability-increasing management functions. An example is the current consumption in bus networks or in bus users during times of little or of no activity on the bus (that is, the operating current consumption, in contrast to the above-mentioned fault current consumption). Such low level current consumption necessarily impairs the reliable or sufficiently long availability of the whole bus network if only a predetermined amount of electric energy is available for the operation; such as, for example, from the starter battery of a transport device or the support battery of a measuring station for the emergency reception of data, etc. In this case, the limited energy supply restricts not only the availability of the bus with all its communication devices, but also the availability of the applications controlled by the bus network and their fail-safe routines for dealing with the occurrence of a bus collapse.

In order to limit the current consumption, it is known to completely switch off individual units using the bus, which are not required during a particular operating phase.

Thus, for example, in motor vehicles it is known to supply electronic control units whose current consumption is problematic when the vehicle is stopped, with current from a terminal of the ignition/starting switch. When the ignition/starter key is withdrawn, they are therefore disconnected from the vehicle current supply. Systems whose operability is absolutely necessary even when the vehicle engine is not running are supplied with current by a terminal which is constantly connected to a current supply.

However, if it is assumed that only the voltage regulator of each such constantly supplied apparatus requires approximately 500 $\mu$A, the quiescent current demand of the transceiver (receive discriminator and output stage) between the bus and the electronic system amounts to approximately 150 $\mu$A. Since the quiescent current demand of the respective peripheral apparatus (for example, voltage dividers, sensor current sources, etc.) each amounts to approximately 500 $\mu$A, a total quiescent current requirement of more than 1 mA will result for each apparatus.

If, a motor vehicle having bus-networked control units has, for example, 30 of such units, there would be a total quiescent-current requirement of at least 30 mA. In the case of a motor vehicle, this may mean that because of a constant discharge of its battery, after approximately 3 to 4 weeks the vehicle can no longer be started. Thus, in motor vehicles which are to be shipped to another continent, for example, it is necessary to disconnect the battery from the electrical system of the vehicle before the shipping, in order to ensure that the vehicle can be started at the receiving site.

It is therefore an object of the invention to provide an integrated semiconductor circuit for coupling a microcontrolled control apparatus to a two-wire bus, which increases the network availability.

According to one feature of the invention, the availability of the bus network is increased by providing a bus-fault-tolerant transceive function which permits communication even when a bus fault is present, together with bus-fault recognition and treatment devices which disconnect the bus from its normal user connections upon the occurrence of a fault. This measure prevents the flow of parasitic currents from the users through the bus which, in the case of a battery-supported bus system, limits the availability of the bus network by draining the battery. This feature of the invention therefore achieves an increase of the network availability on the communication plane as well as on the energy plane for the operation of the network.

A second feature of the invention increases the availability of the bus network by providing a transceive function with two separate operating modes which can be set by the microcontroller: a transmitting and receiving mode ("NORMAL") and an inactive or dormant mode ("SLEEP"). The circuit comprises wake-up devices which can be activated by the bus as well as by way of a special input when it is in the "SLEEP" mode, and wake-up analysis devices which can start or initialize in a defined manner a microcontroller kept in the low-power or shutdown mode, so that circuits controlled by it can be connected to a current supply. Alternatively, the wake-up analysis devices can cause the current supply of the microcontroller as well as that of other current consuming devices to be switched off completely and, when required, can be built up again in a controlled manner.

The integrated semiconductor circuit according to the invention provides a bus-networked electronic control apparatus which is able to communicate for the longest possible time period even under difficult communication conditions, using a limited energy supply, and can remain in an operating condition with a reduced activity, from which in a controlled manner the apparatus can rapidly again develop the normal activity. According to the invention, the bus protocol function and the microcontroller are unnecessary to maintain the normal wake-up capability of the control apparatus, including the case of a bus fault.

The circuit according to the invention can include all signal discriminators and signal editing devices necessary for reception from the bus, the transmitting bus wire drivers and their coupling devices, as well as all devices for real-time bus fault recognition and treatment, and devices for adapting the transmitting and receiving devices to deal with fault situations. These elements can be accommodated in a single semiconductor circuit which therefore represents a physical layer between the bus protocol chip (or the bus protocol function) of the concerned control apparatus and its microcontroller, and the two wires of a bus (for example, CAN bus). The circuit according to the invention dispenses with the need for software to operate the microcontroller for recognizing wake-up signals or possible bus errors, for switching-off or disconnecting the transmitting devices from the bus in response to the occurrence of faults, and for reconfiguring the receiving and transmitting devices to change from a differential (two-wire) operating mode to a single-wire operating mode by way of the ground. By means of this concept, reaction time ranges can be achieved which make it possible to avoid message losses.

Several embodiments of the integrated semiconductor circuit are illustrated in the drawing and will be explained in detail in the following description. The abbreviation "IC", known to those skilled in the art, is used for the term "integrated semiconductor circuit". Because of the complexity of the functions which the IC performs, and which are more or less mutually correlated, the characteristics are explained in the context which can be best understood, while the implementation alternatives (which differ, dependent upon the particular application) are differentiated from one another in the claims.

Other objects, advantages and novel features of the present invention will become apparent from the following detailed description of the invention when considered in conjunction with the accompanying drawings.

DETAILED DESCRIPTION OF THE DRAWINGS

Figure 1A:
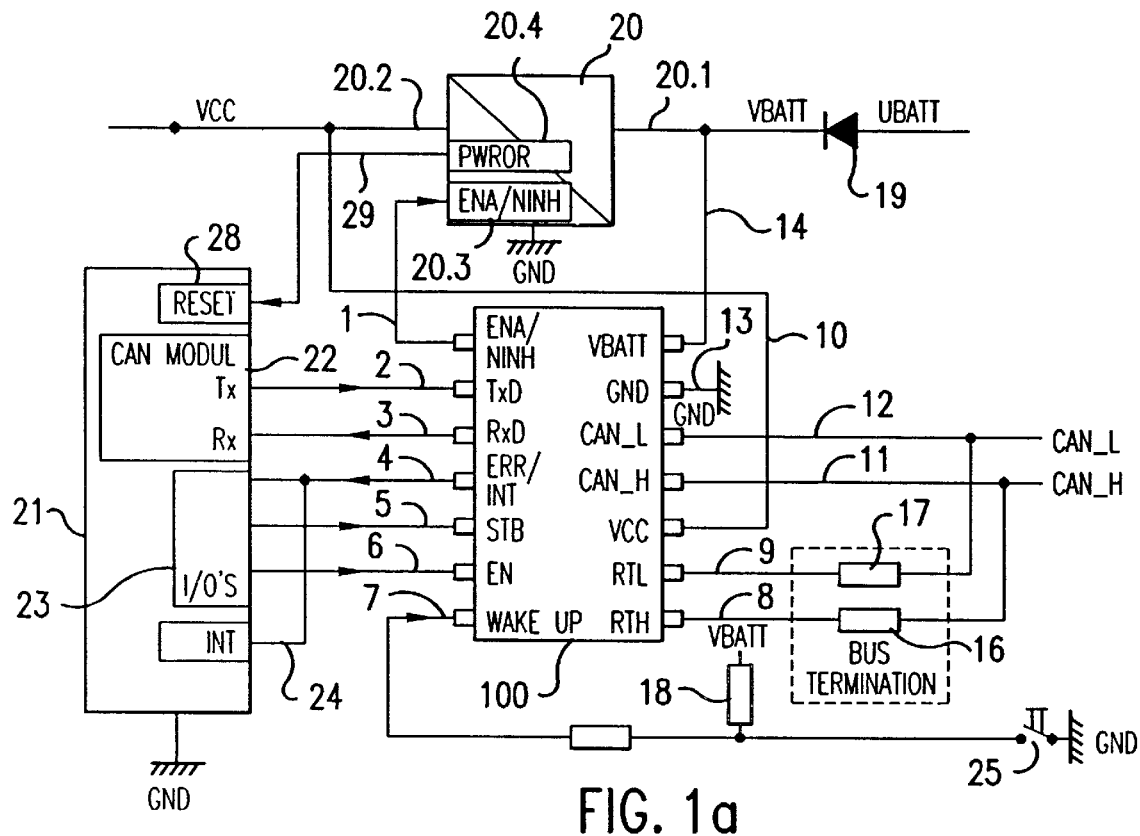
FIG. 1a is a circuit diagram which shows the integrating environment of the IC in a first embodiment, which controls a voltage regulator.

In FIG. 1a, the IC 100 is symbolized as a 14-pole SO circuit element. Preferably, it is constructed in this manner in practice; however, it can also be a system on a monolithic semiconductor chip which is deposited there, such as a component of a more extensive semiconductor circuit, for example, in a compiled standard cell. In any case, the scope of the invention comprises without restriction all implementation forms in-between; to this extent, its depiction as a circuit element is not meant to have a limiting effect.

The IC 100 is connected between the CAN_H and CAN_L bus wires on the one hand, and the bus protocol module 22 assigned to the microcontroller 21 of the particular electronic unit on the other, so that it can uncouple the bus protocol module 22 from the CAN_H/CAN_L bus. (In the following, CAN_H or CAN_L refer to the respective bus wire; while CAN_H/CAN_L refers to both wires, the bus being a physical two-wire line.) For this purpose, CAN_H and CAN L are connected to corresponding terminals 11 and 12 of the IC 100. The IC 100, in turn, is connected by way of connection paths 2 and 3, respectively for data transmission TxD and data reception RxD, with the Tx/Rx communication port of the bus protocol module 22. The IC 100 is also connected with bus wires CAN_H or CAN_L by means of additional connections 8 and 9, and two terminating resistors 16 and 17.

The IC 100 has an input 7 which is connected via a resistor 18 with the logic "H"-potential, such as the supply potential VBATT or a potential which is situated close to the latter. On the other hand, the resistor 18 can be connected with ground GND by way of a switch 25.

The IC 100 has at least one output 4 for the emission of an error or interruption signal (ERROR or INTERRUPT) for the microcontroller 21. This output 4 is connected with a corresponding input of the I/O-port 23 and/or a corresponding interrupt input 24 of the microcontroller 21. Two inputs 5 and 6 are provided for a STANDBY signal (STB at input 5) and a TRANSMIT-ENABLE signal (EN at input 6) respectively, which are controlled vice-versa from the I/O-port 23 of the microcontroller 21.

For its current supply, the IC 100 has a connection 13 to ground GND and a connection 14 to the feed potential VBATT—which is preferably obtained by way of a reverse-polarity protection device 19, from a higher order supply potential UBATT—.

The IC 100 also has a control output 1 and an input 10. The latter is connected, for example, with the output 20.2 of an electronic voltage regulator 20, to whose input 20.1 the feed potential VBATT is also led. The output 20.2 of the regulator 20 supplies operating current to the microcontroller 21 and the bus protocol module 22 as well as the remaining electronic system of the electronic apparatus in FIG. 13. The voltage VCC is reduced with respect to VBATT by the controller decay.

The voltage regulator 20 in FIG. 1a also has an input 20.3 which communicates with the control output 1 of the IC 100 to receive an ENABLE/NOTINHIBIT or NOTENABLE/INHIBIT signal (hereinafter abbreviated ENA/NINH or NENA/INH). Furthermore, the regulator 20 also has a POWER ON RESET output 20.4 (hereinafter abbreviated PWROR) which communicates by way of a line 29 with a reset input 18 of the microcontroller 21.

Figure 1B:
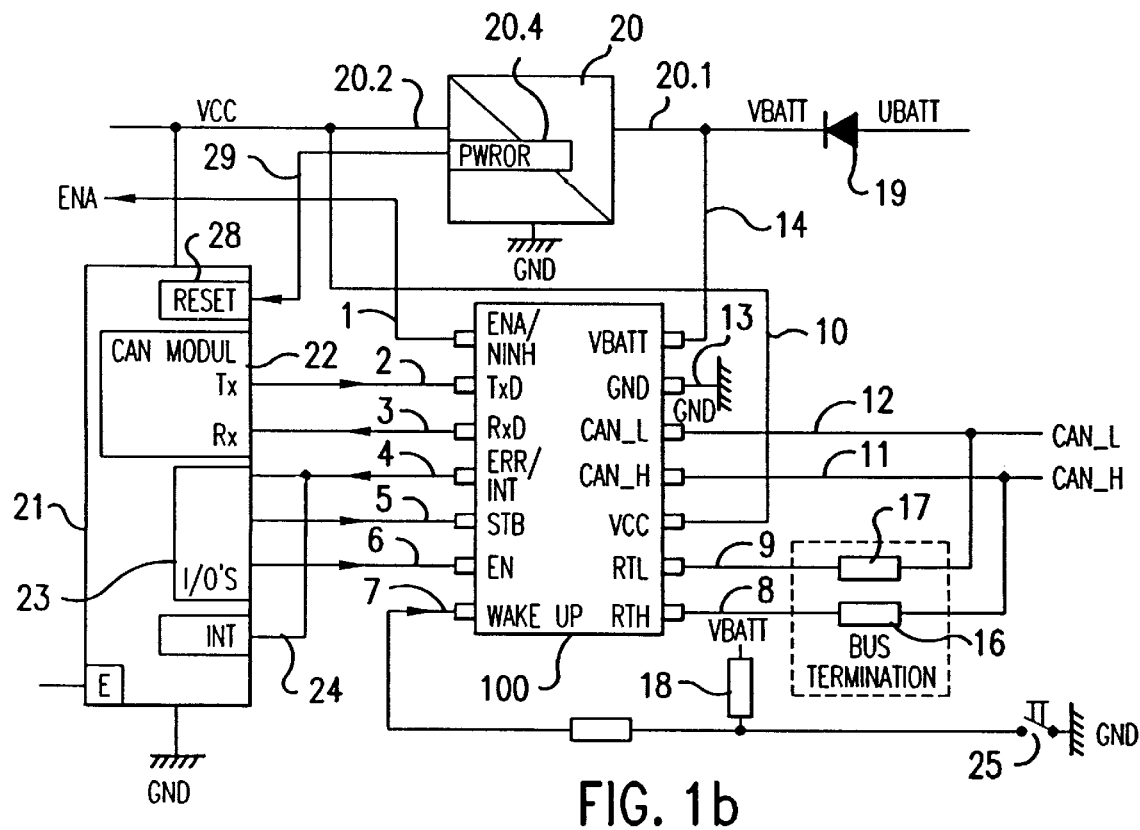
FIG. 1b is a corresponding circuit diagram of a second embodiment, in which the IC controls other current consuming electronic systems to be operated under the bus management.

The IC environment according to FIG. 1b differs from FIG. 1a only in that the regulator 20 in FIG. 1b does not have an input 20.3, and an ENA/NINH signal of the IC 100 is supplied, by way of the path 1 for example, to other modules of the control apparatus in question.

For a better understanding of the IC in an equipment environment described so far, the internal operating structure of the IC will first be discussed in detail by reference to FIGS. 2 to 8.

Figure 2:
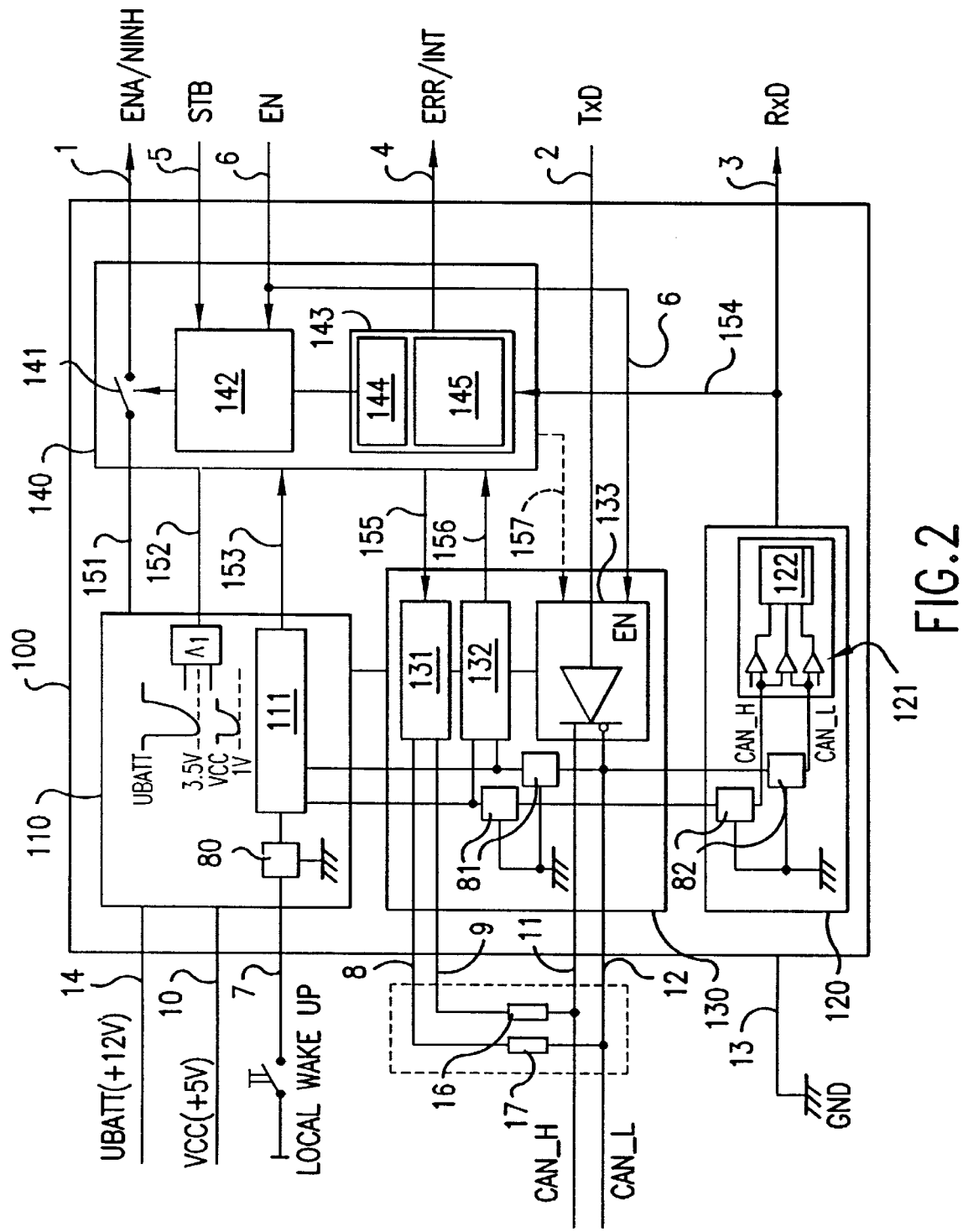
FIG. 2 is a schematic illustration of certain functions of the IC 100 from FIGS. 1a and 1b which, as an example, are combined into function blocks.

In FIG. 2, the IC 100 is, for example, divided into four blocks 110, 120, 130 and 140. (The supply paths of these blocks which are required for the internal current supply are omitted in FIG. 2 for simplicity.) The allocation of specific functions to these blocks is described herein by way of example, and is not absolutely necessary to the invention. This particular distribution was found to be expedient for a first implementation of the IC 100, however, and will be variable within certain limits as a function of different implementation technologies.

An important function of the IC 100 is the electric isolation of the bus protocol module 22 with respect to CAN N and CAN_L, on which surge and load dump transients can occur from the application field. Such transients may destroy the bus protocol module 22 (and under certain circumstances, also the whole microcontroller 21) which, according to the manufacturing technology is more or less sensitive. For this purpose, the IC 100 comprises conventional specialized semiconductor devices which are not described here in detail and which may preferably be contained in block 110. In particular, surge protection is provided with respect to the supply potential rail VBATT. A person skilled in circuit technology is familiar with the implementation of such devices.

Block 110 also provides the internal current supply for all partial functions from the supply potential applied at terminal 14 of the IC 100. A control or switching potential fed, for example, through block 140 (for generating an ENA/NINH signal for control purposes in the bus user apparatus in question or for the voltage regulator 20 in the example according to FIG. 1a) is made available to block 140 by way of a path 151.

Furthermore, block 110 comprises a detector device which detects a drop of the supply potential VBATT (present at terminal 14) below a first limit value VL1 (for example, 3.5 Volt, in the case of a motor vehicle). Preferably, it also detects a drop of the regulator output potential VCC (at terminal 10) below a second limit value VL2 (for example, 1 Volt in the case of a motor vehicle). In addition, it may also detect the simultaneity or time sequence of the occurrence of such voltage drops. The signals of these detectors are linked by logic units to form a power fail signal which can be transmitted to block 140 by way of a path 152. The significance of this signal will be explained in detail further below.

Block 110 also comprises, for example, a wakeup recognition logic (WAKEUP LOGIC) 111, on the one hand, which is connected with the above-described terminal 7 and, on the other hand, with the bus wires CAN_H and CAN_L applied to the connections 11 and 12. This wakeup logic is configured to convert either an analog wakeup signal (or a wakeup signal edge) from the connection 7, or a wakeup message from the bus into a standardized WAKEUP signal, which is transmitted to block 140 by way of the path 153 (for the analysis in 145).

Block 120 preferably comprises all reading devices 121 required for the reading-out of the bus, including both differential and single-wire signal detection, as well as fault remedial and logic devices 122 which are required for bus-fault-dependent change of various reading modes (for example, two-wire, single wire to GND or VCC; possibly also single wire to "dead wire", etc.). These can, for example, comprise relative-level comparators, wire level comparators and/or preceding sign discriminators, among others.

Block 120 may be configured so that it is capable, automatically and independently, of error-responsive adjustment, reconfiguration, and/or adaptation of its receiving devices—independently of the transmitting devices and their corresponding fault-responsive adjustment, reconfiguration, and/or adaptation. That is, it is configured to have absolute operating and functioning autonomy (full-supported receiver). Logic devices 122 emit the digital message signal RxD to the connection 3 of the IC 100 as well as, by way of an internal path 154, to the fault signalizing module 143 in block 140.

Block 130 contains all devices which are part of the signal flow path, and not assigned to the receiving block 120. Broadly speaking, therefore, they are assigned to the transmitting devices in the signal flow path.

This is connected with the fact that both the receiving and the transmitting devices are preferably constructed and dimensioned so that, without requiring external protective measures, they are each separately and autonomously fault-tolerant with respect to all faults which are possible on a bus-wide scale in an application-specific manner. That is, they cannot be damaged by such faults. To this extent, the function blocks 131 and 132, which are also situated on the bus (together with the wakeup devices 111 and the receiving devices 120), are in this example, assigned to the transmitting block 130. To this extent, block 130 contains transmitting devices in the broadest sense; in a narrow sense, block 133 comprises transmitting devices. (The design details for a damage-free fault tolerance, to be provided as a function of the respective selected implementation technology of the IC 100, are known per se.)

In block 130, the function block "termination switch-over devices" 131 changes the bus termination over to a high-impedance, as prescribed by the terminating resistors 16 and 17. A function block 132 "bus fault recognition devices" detects fault conditions on CAN_H/CAN_L, in particular short circuits of a bus wire to ground GND or to UBATT in the sleep and standby mode (SLEEP/STANDBY). Transmitting devices in the form of an output stage 133 which is fault-tolerant as described above contains internal individual CAN_H and CAN_L drivers which are led to the output terminals 11 and 12.

Such an output stage may comprise highside and lowside switches as essential elements whose switching outputs are applied to the bus wires by way of coupling diodes. In any event, the output stage is designed so that it can be adjusted, reconfigured or adapted as a function of the type of an occurring bus fault, to implement the best possible emergency communication mode (for example, by changing to single-wire operation). As required, block 130 also comprises devices necessary for this purpose.

Optionally, the output stage can also be constructed so that it remains automatically disconnected from the CAN H/CAN_L bus (for instance, by blocking its EN-input) when a defect or an intrinsic fault occurs in the IC 100. (Such disconnection may be of a compulsory type.) Furthermore, the current supply of the output stage may be designed so that it can be automatically disconnected, particularly in the case of an intrinsic error. Thus, particularly in the case of errors in the region of the output stage, its input signal path or its condition control, latchup of the bus network by the faulty energizing of the bus wires is avoided. The above-mentioned coupling diodes then act as uncoupling valves.

Function block 132 is connected with function block 131; furthermore with the control block 140. It also communicates with the transmitting output stage 133, which has a switch-on/switch-off input (TRANSMIT-ENABLE) that communicates with terminal 6 of the IC 100.

The capability for mandatory disconnection of the output stage 133 from the CAN_H/CAN_L bus can be implemented, for example, so that the input EN of the output stage 133 can be latched in the event of a defect, so that the transmission signal TxD can no longer affect the bus. Such a mandatory disconnection can also be provided for a case in which the potential VBATT and/or VCC drops below a predetermined threshold value, so that any undesirable inactive burden load on the bus is avoided.

The control block 140 also performs several functions. For example, for initializing the microcontroller 21, it has a controlled switch or a gate 141 which emits at the terminal 1 of block 100 a switch-off or switch-on signal ENA/NINH for the voltage regulator 20; a function block 142 for recognizing and adjusting the operating modes required by the microcontroller ("sleep", "standby", "receive only" and "normal"), the latter corresponding to "transmitting and receiving"; and an error signalizing module 143.

The error signal module 143 preferably includes a function block 144 for analyzing bus faults and generating a (BUS-)ERROR-INTERRUPT signal, and a function block 145 for generating a WAKEUP-INTERRUPT signal as a function of a wakeup signal and/or of a POWER-FAIL-INTERRUPT signal (due to a supply deficit condition) as described below. As also described below in conjunction with FIG. 12*b*, for generating these different signals, the block 143 contains, for example, at least three flag flipflops for a WAKEUP, a POWER FAIL and a BUS ERROR flag. These flags are read out as INTERRUPT as a function of the operating mode.

To recognize the different operating modes, the function block 142 has, for example, a port which is two bits wide, consisting of an input 5 for the STB (STANDBY) and an input 6 for EN (TRANSMIT-ENABLE). As mentioned above, the latter is connected with the identically labelled switch-on/switch-off input of the output stage 133. The invention is naturally not limited to the four illustrative operating modes of the IC 100, which can be selected in a binary manner by two logic levels.

Function block 142 is also connected with the error signalling module 143, which in this example, has a single ERROR/INTERRUPT output (hereinafter abbreviated ERR/INT) connected to the output terminal 4 of the IC 100, for an error indication or interrupt signal. An input to the signalling module 143 receives the digital message signal emitted by block 120 by way of the above-mentioned path 154. Different meanings can be allocated to an ERR/INT signal on terminal 4 by means of an assigning to different operating modes of the IC 100.

If a correspondingly larger number of connections for the IC 100 can be tolerated, at least two separate outputs may also be provided for ERROR or INTERRUPT signals, which then do not have to be interpreted as a function of the operating mode. The different interpretation of the signal at the output 4, which is necessitated by this limitation of the number of terminals (to, for example, a total of fourteen), will be described below in conjunction with FIGS. 12*a* and 12*b*.

Furthermore, according to the invention, block 143 generates the ERR/INT signal by means of a logic linking, for example, of an internal ERROR result signal from the bus error analysis devices 144 and an internal signal from the analysis devices 145, indicative of wakeup and/or offset voltage events (for example, a drop below a limit value for the operating voltage VBATT of the IC 100).

The operation of the IC described so far, and its interaction with the components illustrated in FIG. 1*a*, is as follows.

The voltage regulator 20 includes elements which generate a PWROR-signal at the output 20.4 each time the unit is switched on. This signal is transmitted by way of the terminal 29 to a reset input 28 of the microcontroller 21 in order to ensure its proper initialization after the buildup of its feed voltage VCC.

Figure 12A:
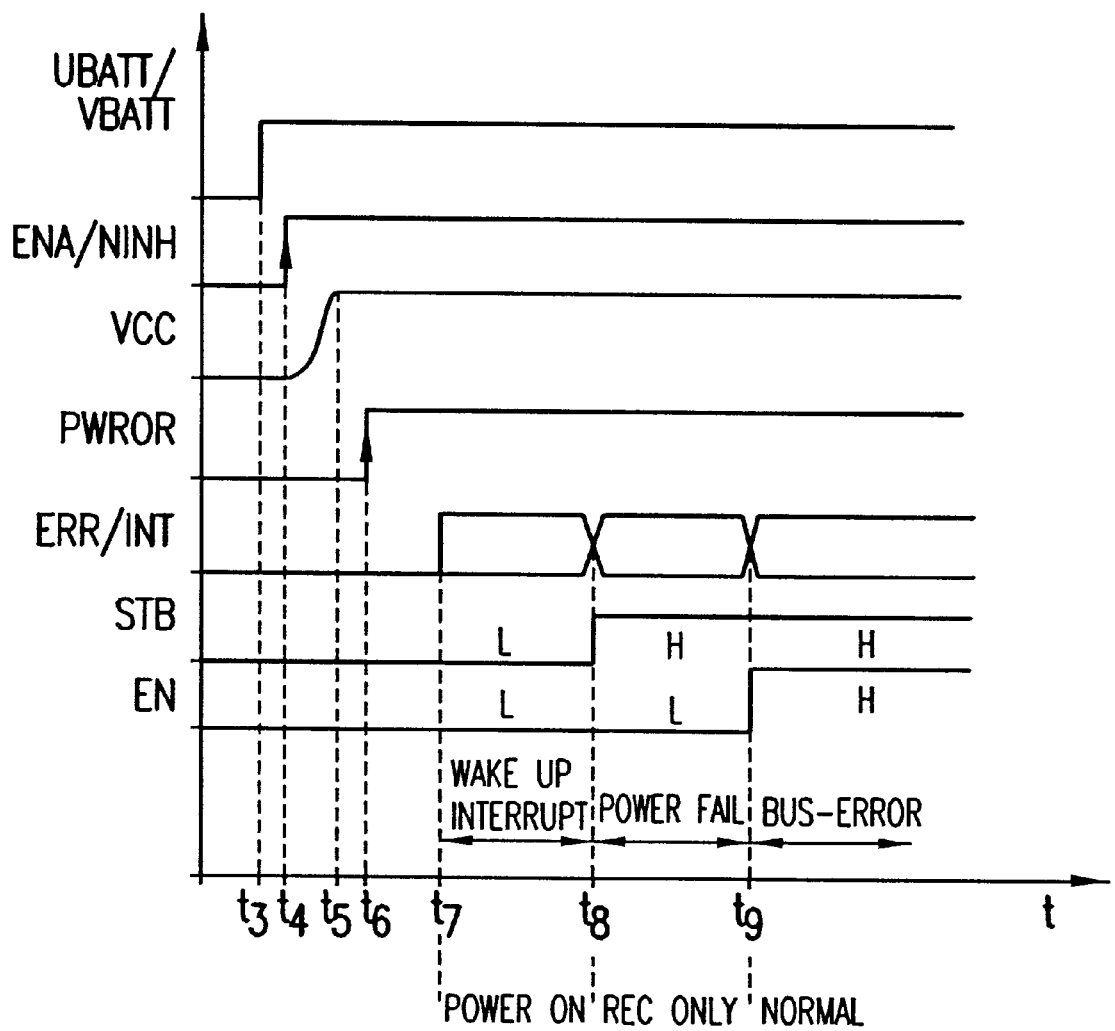
FIG. 12a is a simplified time diagram which illustrates different voltage courses after connection to an operating current source.

Since the voltage regulator is switched on by ENA/NINH from the IC 100, the initialization path regulator-microcontroller can be checked for errors in IC 100, by monitoring the time period between the ENA/−NINH edge which activates the regulator 20 and one of the EN− and STB bits for adjusting the initial operating mode of the IC 100 ($t_8$–$t_4$ in FIG. 12*a*).

The selection bits present at the terminals 5 (STAND BY/STB) and 6 (TRANSMIT ENABLE/EN) select one of the four operating modes (for example) SLEEP, STANDBY, RECEIVE ONLY, and NORMAL of the IC 100. These operating modes are managed within the framework of a higher order bus management software for the operation of the bus network and are initiated explicitly by the application software of the corresponding electronic apparatus in which the considered IC 100 is situated.

In the SLEEP operating mode, the switch or the gate 141 is activated so that the logic signal ENA/NINH emitted from the control output 1 to the control input 20.3 of the voltage regulator causes the regulator 20 to be switched off. To save current, the logic potential at the control output 1 in this operating mode is, for example, "L". Because the regulator 20 is switched off, the microcontroller 21 and the bus protocol module 22 are without supply voltage VCC and are therefore current-free. Thus, the potential present at the two input(s) 5 (STB) and 6 (EN) is zero, and no current can flow. This condition corresponds to the selection word "LL" at the I/O port 23 of the microcontroller 21 for the two signals STB and EN in the SLEEP operating mode.

Thus, in this case, only the feed voltage VBATT exists at the IC 100, while the voltage VCC at connection 10 is zero. In this condition, minimal current is consumed, therefore, caused only by means of the IC 100 from the busbar VBATT. Since VCC=zero, the whole VCC-supplied electronic system of the control apparatus in question has zero current.

In the SLEEP operating mode, the IC 100 must recognize only a defined minimal activity on CAN_H/CAN_L and/or quasi-static wakeup requests at the terminal 7, for example, from a switch 25. In order to save current, the latter is designed to make contact to ground GND, and, as required, must also generate the ENA/NINH signal. It therefore requires no more than a supply current of 30–500 µA.

This operating mode can therefore be used for control apparatuses which can tolerate a certain lag time (order off magnitude 25 ms) between the buildup of the potential VCC and excitation of the internal clock frequency, and the initialization of the watchdog of the microcontroller 21. By minimizing the current consumption of a battery-supported CAN bus network under such operating conditions, the IC 100 during times of its communication idleness considerably increases the availability of the network.

In the case of a wakeup due to activity on CAN_H/CAN_L, such activity is sensed by the wakeup logic 111 in block 110 which causes the switch 141 in control block 140 to activate the voltage regulator 20. As a result, VCC is switched on, activating the bus protocol chip 22, of the clock oscillator of the microcontroller 21 and its watchdog (not shown). The message data can also be output to the Rx input of the bus protocol module 22, via terminal 3.

In the case of a local wakeup by the switch 25, actuation of the latter causes the input 7 to be set to "L". In response, the wakeup logic 111 likewise actuates the switch or gate 141 via path 153, therefore causing the same wakeup result.

The device can be switched to the NORMAL operating mode from the SLEEP mode by means of a wakeup request, either by way of the bus (by means of the wakeup recognition logic 111) or as a local request by the switch 25.

In the STANDBY operating mode the ENA/NINH signal emitted by the IC 100 to the voltage regulator 20 switches on the latter or keeps it switched on. Therefore, the supply voltage VCC will also be present in the STANDBY operating mode. As result, the bus protocol module 22 and the remaining electronic system of the apparatus in question are kept operative, and the microcontroller 21 can emit the STANDBY signal level "H" (which differs from "L") to the input 5 of the IC 100.

The STANDBY operating mode can therefore be used for apparatuses or situations in which the lag time (order of magnitude 25 ms) that can be tolerated in the sleep mode until the bus protocol chip becomes operable, must not be lost. Practical examples are: the neutral travel of the cylinder on a printing machine and infrared remote control of the door locking system of a motor vehicle. In order to avoid response inhibitions and/or message losses, these functions require a receive readiness within a very short time period.

The IC 100 can be placed into the STANDBY, RECEIVE ONLY and NORMAL operating modes in three ways: from the microcontroller 21 by way of terminals 4, 5 and 6; by the CAN_H, CAN_L bus; and by a local wakeup request (for example, by means of a switching contact).

In the environment of FIG. 1a, it is important in all three cases that during the wakeup, the two control bits EN and STB of the switch-on signal ENA/NINH first have the logic condition "L", and to maintain the switch-on signal ENA/NINH, one of these bits must change to the logic level "H". The provision of the switch-on signal ENA/NINH is therefore in this case divided into an initialization phase under control by the IC 100 (as long as the microcontroller 21 is not yet completely supplied with current or completely initialized), and a holding phase under the control by the microcontroller.

With this understanding, each of the functions and application possibilities of the IC 100 in the modified equipment environment of FIG. 1b takes place automatically.

In each embodiment, the microcontroller 21 must not be switched off because it must, for example, in a low-power or shutdown mode, cyclically carry out monitoring functions, at a reduced frequency or activity level in order to save current. However, because of the unacceptability of an even slight delay, it must be able to be driven up very fast locally, so that the regulator 20 cannot be switched off. In such a case, the switch-off signal NENA/INH which is complementary to ENA/NINH, can be used, as required, for switching off those portions of the control apparatus in question which are relevant to the monitoring in the SLEEP operating mode, as symbolized here by the transmission arrow to 1. By means of this modified form of energy saving, the IC 100 can increase considerably the availability of a battery-supported CAN network.

Figure 3A:
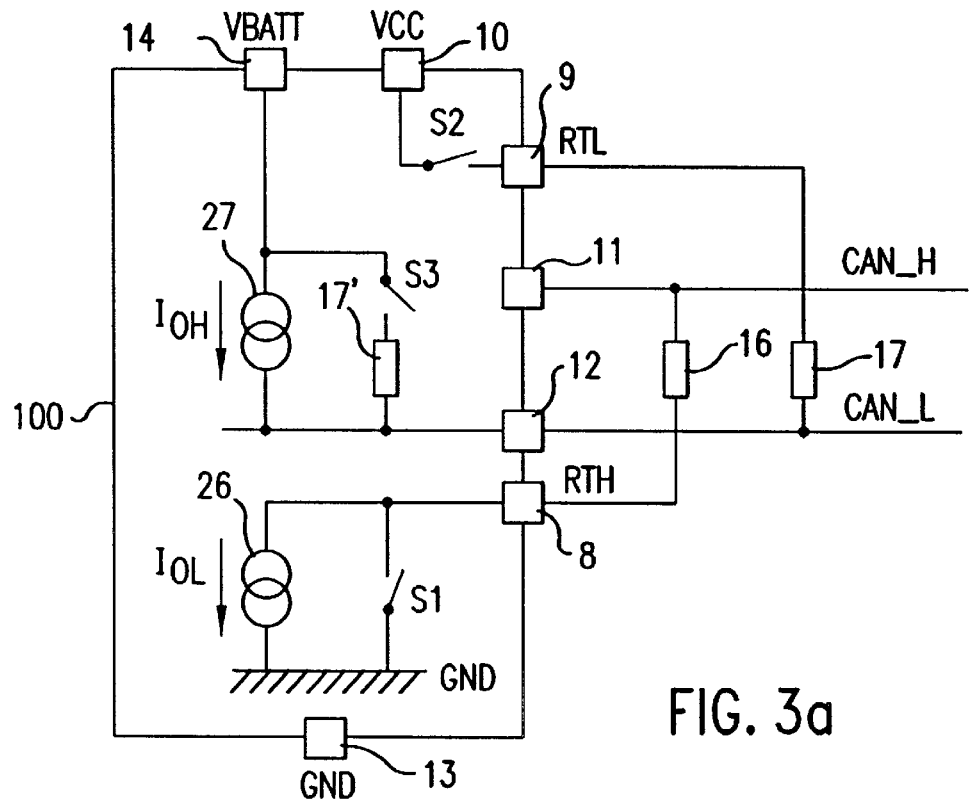
FIG. 3a is a schematic diagram of the termination wiring of the bus wires caused by the function block 131.
Figure 3B:
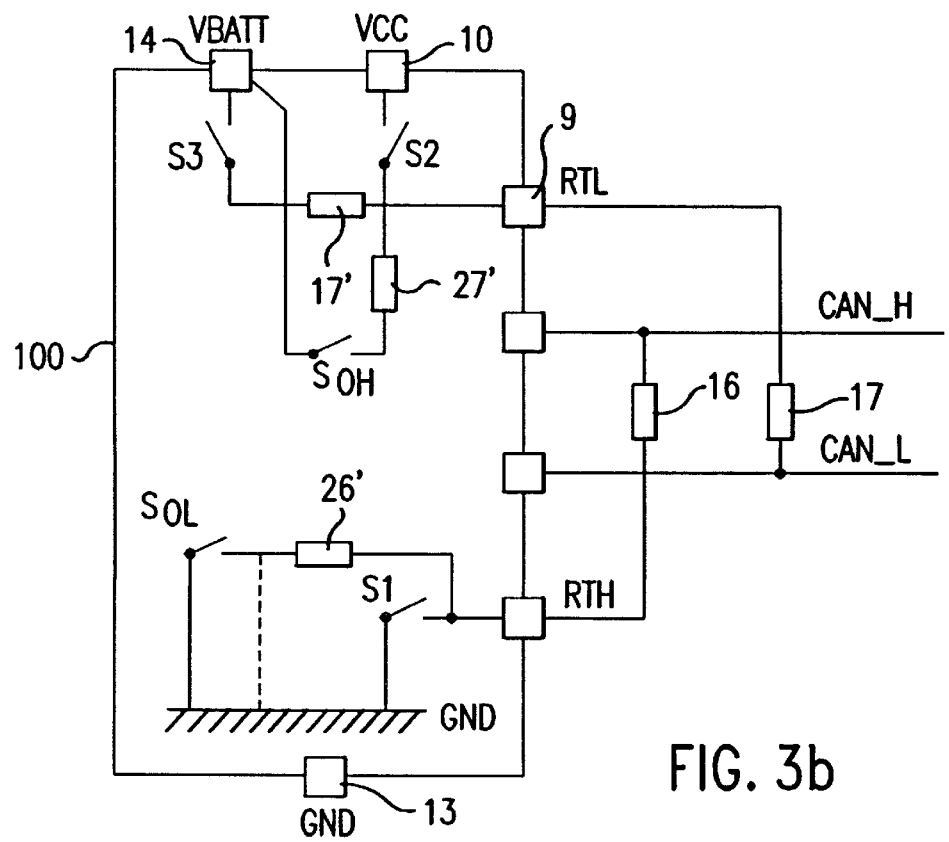
FIG. 3b is a schematic diagram analogous to FIG. 3a, with a resistive replacement of impressed current sources and with another switching function.
Figure 4:
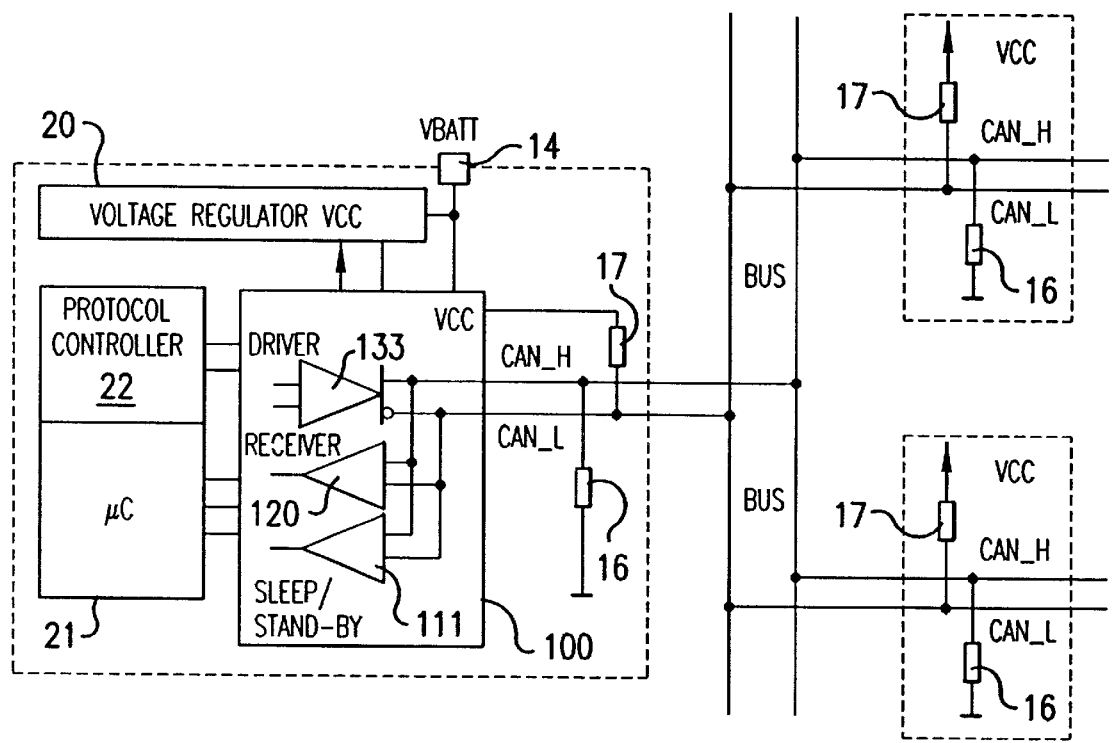
FIG. 4 is a schematic diagram of a portion of the IC in a CAN network which couples it to other IC's of the same type in other bus subscribers, configured in the "NORMAL" operating mode.

The method of operation of the function block 131 with regard to the terminating resistors 16 and 17 connected to CAN_H and CAN_L will now be explained by reference to FIGS. 3a to 7. FIGS. 3a and 4 illustrate the termination circuitry of CAN_H and CAN_L in the normal active operating mode (transmitting and receiving), in the absence of a bus fault.

According to FIG. 3a, the function block 131 contains, among other devices, a switch $S_1$ which can connect the connection point 8 with ground GND, thus connecting switch CAN_H to the ground by way of the external termination resistor 16. A switch $S_2$ can connect the connection point 9 to the regulated supply potential VCC, thereby connecting CAN_L to VCC via the external termination resistor 17. At least one additional switch $S_3$ can connect CAN_L by way of an internal resistor 17' with the higher supply potential VBATT. Switch $S_1$ is bridged by a current source 26 with impressed current $I_{OL}$ and the switch $S_3$ is bridged by a current source 27 with impressed current $I_{OH}$. The currents $I_{OH}$ and $I_{OL}$ are very small and may uniformly be in the order of magnitude of, for example, 1–20 µA. Without limiting the generality, the current sources may be replaced by high ohmic resistors of, for example, 50–250 kΩ, as illustrated in FIG. 3b.

The termination resistors 16 and 17 are identical and are determined as a function of the previously known number of bus users. Normally, they may, for example, have 560 Ω±5% in the case of a fairly large bus network, and at most 15 kΩ±5% in the case of a small bus network. The low impedance in larger bus networks results, on the one hand, from the higher capacitive burden of larger networks and, on the other hand, from the requirement of a sufficient suppression of undesirable static and electromagnetic interferences in a spatially highly branched bus network. In a bus network designed for approximately 20 users, the internal resistor 17' (which is preferably integrated in the IC 100) has a value on the order of 12 kΩ, assuming that resistor 17 is on the order of 600 Ω for normal termination. For details concerning the dimensioning, see FIGS. 6 and 7 and the pertaining description. In practice, an ON-resistance of switches $S_1$ to $S_3$ of up to 200 Ω may be tolerable.

In the NORMAL operating mode (transmitting and receiving), the switches $S_1$ and $S_2$ are closed but $S_3$ is open. That is, CAN_L is connected to VCC by way of resistor 17, and CAN_H is connected to ground GND by way of resistor 16. As long as no bus error is present, the influence of the currents $I_{OH}$ and $I_{OL}$ is negligible.

To this extent FIG. 4 illustrates only the important parts of a network circuit diagram of a CAN (with, for example, three bus-networked units A, B and C) in the NORMAL operating mode, which is effected by means of the corresponding position of the switches $S_1$ to $S_3$. Thus, in each case, all external termination resistors 16 and 17 of bus users A to C on CAN_H or CAN_L operate in parallel.

Referring again to FIG. 3a, in the SLEEP and STANDBY operating modes the switches $S_1$ and $S_3$ are closed; $S_2$, on the other hand, is open. Thus, CAN_L is now connected to the higher potential VBATT by way of the higher internal resistor 17', and CAN_H is connected to ground GND by way of resistor 16. As long as no bus fault is present, the influence of currents $I_{OH}$ and $I_{OL}$ is also negligible here.

Figure 5:
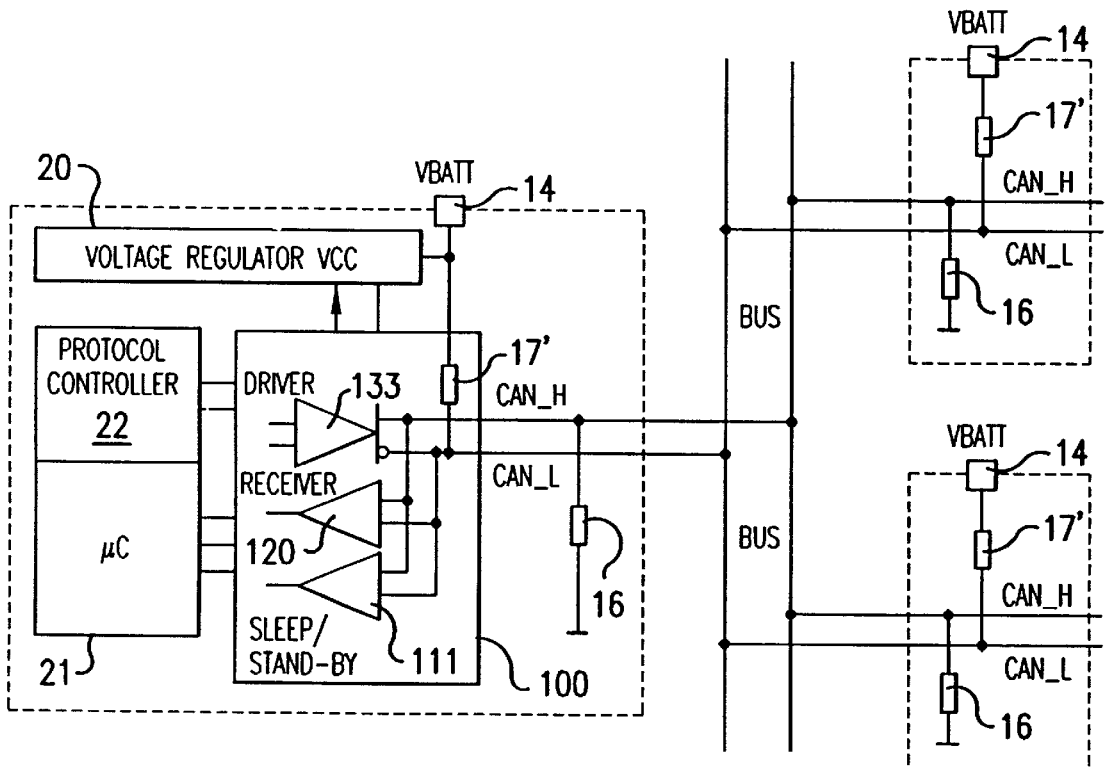
FIG. 5 is a schematic diagram similar to FIG. 4, configured in the "SLEEP" or "STANDBY" operating mode, without bus faults.

Correspondingly, FIG. 5 illustrates only the important parts of the network circuit diagram of the same CAN in the SLEEP and STANDBY operating mode, which is effected in this case by the corresponding positioning of the switches $S_1$ to $S_3$ as indicated above. Thus, in each case, the external termination resistors 16 and the internal termination resistors 17 of bus users A to C on CAN_H and CAN_L operate in parallel.

Therefore, in the SLEEP and STANDBY operating modes, an asymmetrical bus termination exists in all units connected to the network. That is, on the one hand, the values of the resistors 16 and 17' differ (in each case depending on the number of bus users) approximately by a factor which corresponds to this number; and on the other hand, the resistors 17', in contrast to the resistors 17, are not connected to VCC as the reference potential, but rather to the higher feed voltage VBATT. As a result of this measure, the wakeup capability of the CAN by way of CAN_L is ensured, even when there is an interruption of CAN H, as explained below by means of FIGS. 6 to 8.

Figure 6:
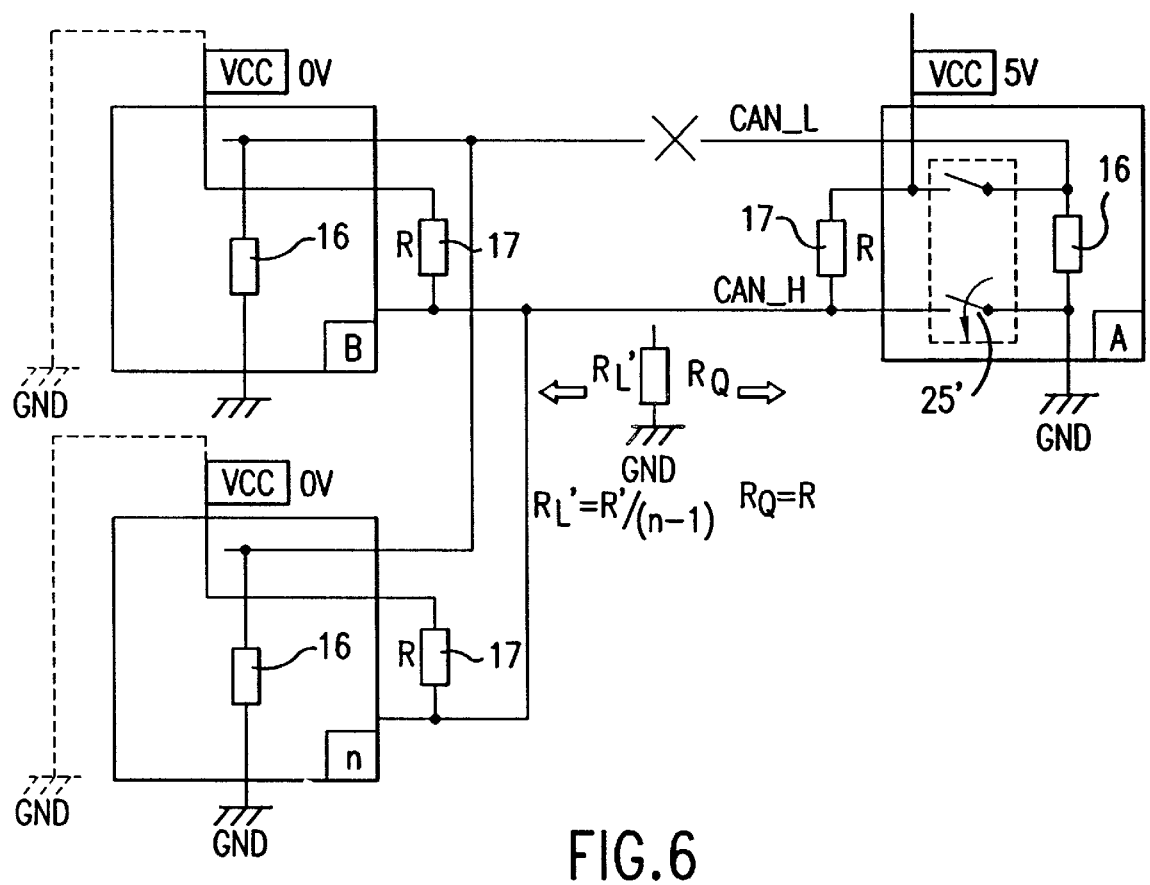
FIG. 6 is a schematic diagram for explaining the non-wakeup capability from the SLEEP mode of a symmetrically terminated CAN by way of CAN_L in the case of an interruption of CAN_H
Figure 7:
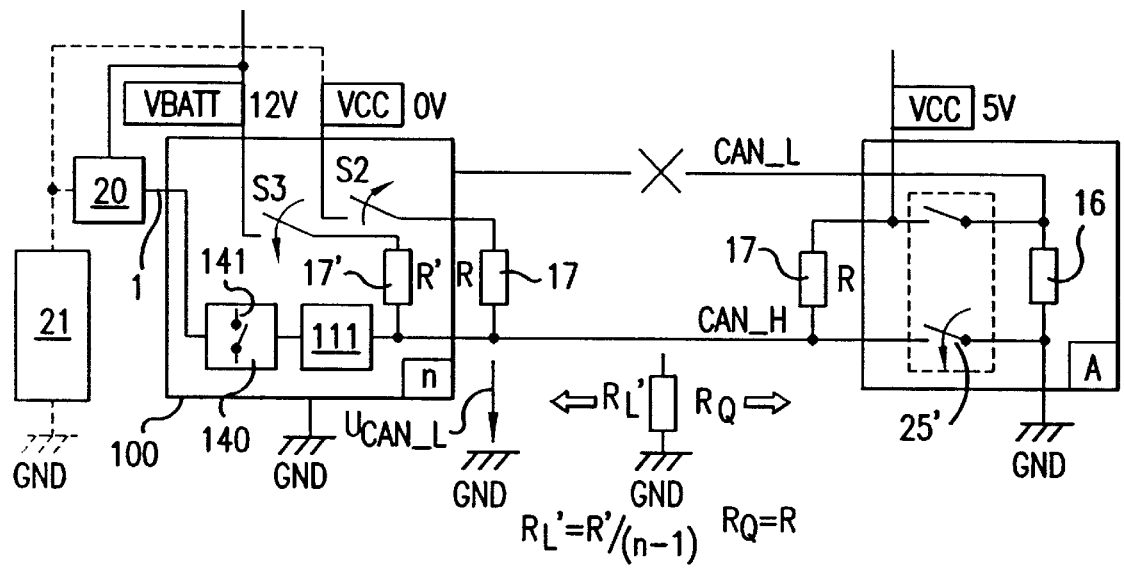
FIG. 7 is a schematic diagram for explaining the wakeup capability from the SLEEP mode of an asymmetrically terminated CAN by way of CAN_L in the case of an interruption of CAN_H.

In FIGS. 6 and 7, the switch 25' shown in apparatus A, represents the electronic switch which, upon activation, switches the wire CAN_L from its high recessive level to the active level of the CAN_L which is only slightly above ground GND potential. The switch 25' therefore not only functions similarly to the already mentioned switch 25 to ground GND on the local wakeup input 7 of the IC 100, but also becomes active within the IC 100 in response to activation of an external local wakeup switch 25.

According to FIG. 6, in the SLEEP operating mode, the voltage regulators 20 in the bus users A to n (not shown) are switched off. As a result, VCC is eliminated as the termination potential because, in the absence of VCC, all VCC busbars of the apparatus are connected virtually to ground GND. If, in this case, CAN_L were terminated by resistors 17' having a value corresponding to that of resistors 17 and 16 which are connected to VCC (that is, connected virtually to ground GND in the sleep mode), for example, in the case of an interrupted bus wire CAN_H, a wakeup via the CAN_L bus wire would not be possible.

A resistor 17 of the value R—as a wakeup source resistor $R_Q$—could therefore, from potential VCC in the waking-up bus user A, raise the bus wire CAN_L with respect to the overall load resistance to ground of $R_L=R/(n-1)$ (assuming, for example, 1/20 R, based on twenty parallel-acting resistors 17 of the same value R in a bus network having 21 users), only by a small fraction of VCC, to a potential in the range of 100–200 mV. Such a potential would not be sufficient to read such a wakeup message without interference. This problem increases with the number of network users and parasitic ground offsets (due to current loops), for example, longitudinally extending systems or vehicles.

A remedy is provided by the measures shown in FIG. 7, In which the resistor 17' has a considerably higher value corresponding to a multiple of approximately the number n of units connected to the bus. (Thus, for example, approximately 12 kOhm when the resistor 17 corresponds to approximately 600 Ω in a bus network of approximately 20 users.) The waking-up unit A therefore "sees" the overall higher load resistor $R_L'=R'/(n-1)$.

In addition, the resistor 17' is not connected to potential VCC (normally approximately 5 Volts) which disappears in the SLEEP operating mode. Rather, it is connectible by means of $S_3$ to the significantly higher feed potential VBATT (for example, approximately 12 Volt) which is available even in the SLEEP operating mode. As a result, the source function of the unit A which is waking-up in FIG. 6, changes over into a source function of all units B to n to be awakened on the bus, while a sink function remains for the unit A which is waking-up.

Figure 8:
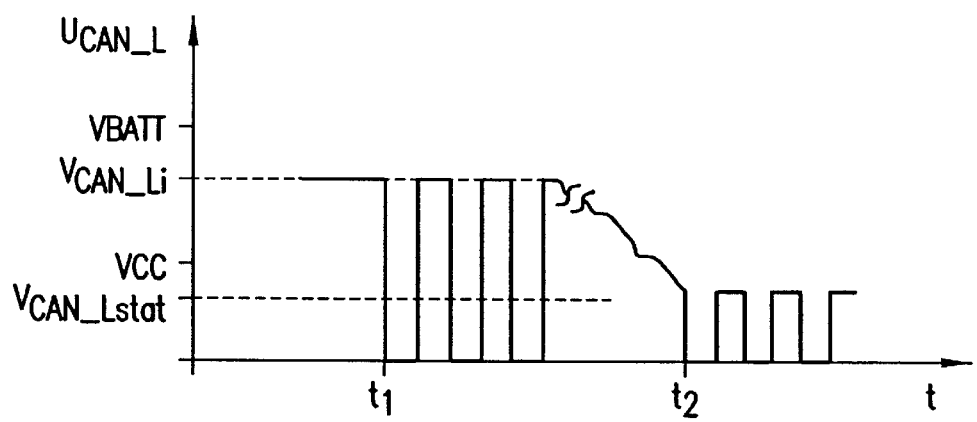
FIG. 8 is a diagram of the voltage course on the asymmetrically terminated bus wire CAN_L during a wakeup operation according to FIG. 7.

FIG. 8 shows the voltage waveform on the wire CAN_L of a CAN which is asymmetrically terminated in this manner in the SLEEP mode, starting at the time $t_1$ of a wakeup operation via this wire. Initially, the voltage level difference on CAN_L has a value of $V_{CAN\_Li}$ between VCC and VBATT. Triggered by the wake-up message on CAN_L (which can be positively recognized in the case of this large voltage level difference), the IC 100 generates the ENA/NINH signal in each of the units A to n connected to the bus. The ENA/NINH signal on the one hand, switches on all voltage regulators 20 in units A–n via the above-mentioned function blocks 111 and 140, together with the switch or gate 141. Hence, VCC becomes available in each unit.

On the other hand, when VCC is available the connection between CAN_L and the feed potential VBATT via the high-ohmic terminating resistor 17' is broken by switch $S_3$, and instead CAN_L is connected with the lower feed potential VCC by means of $S_2$ and the normal terminating resistor 17. It is therefore demonstrated that the drop in the voltage level difference on the bus over ground is terminated to a stationary value $V_{CAN\_Lstat}$ at a point in time $t_2$, the time period $(t_2-t_1)$ being essentially the overall response time of the IC 100 and of the regulator 20 to a wakeup signal.

At this point, it should be noted that, within a bus network, individual users can remain in the STANDBY mode, while others are in the SLEEP mode. Other bus users could in this case also be awakened by a unit in the STANDBY mode if, for this purpose, the lowside switch of the output stage 133 can be activated in the sense of the symbolic switch 25'.

The STANDBY operating mode may be useful, for example, for an automatic film processor which is waiting to take in negatives, or for the infrared reception part of a locking system of a vehicle which must wait continuously for the arrival of a fed film or a coded unlock signal. In such an apparatus, the voltage regulator 20 is switched on in this mode, and VCC is therefore present, so that the time delay $(t_2-t_1)$ until a response via the bus is for the most part eliminated.

Without limiting the generality, the function block 131 may also have a circuit diagram according to FIG. 3b. In this case, the resistors 17 and 17' each operate in series. Resistor 17' would therefore be operative on connection 9 of the IC 100. However, in principle, this does not change the viewing of the network according to FIGS. 4 to 11.

Furthermore, FIG. 3b illustrates that the resistor 26' (which corresponds to the current source 26 in FIG. 3a) can also be interruptibly connected with the ground GND by way of a separate switch $S_{OL}$. This arrangement permits a test function, for example, in connection with the automatic adaptation of the level comparison of the receiving devices 120 and/or of the transmitting output stage 133, in the case of a bus fault or in the case of external diagnostic measurements on the bus. In the embodiment of FIG. 3a, this effect can also be implemented by a pinch-off control of the current source 26.

Figure 9:
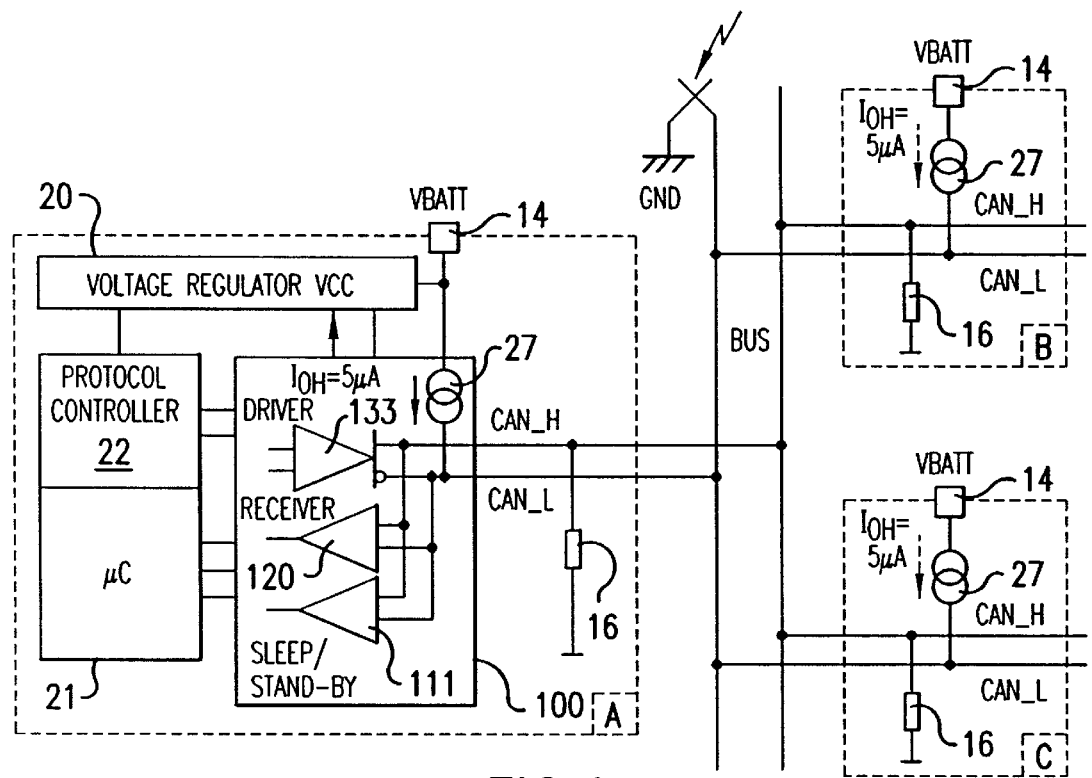
FIG. 9 is a schematic diagram of a portion of the IC in a CAN network which couples it to other IC's of the same type in other bus subscribers, configured in the "SLEEP" or "STANDBY" operating mode, with ground contact to CAN_L.

Based on the circuit diagram of FIG. 3a, FIG. 9 illustrates the conditions in the wide network interconnection in the case of a short circuit of the CAN_L bus wire to ground GND in the "SLEEP" or "STANDBY" operating mode. Assuming that resistor 17' has a resistance value of, for example, 12 kΩ, in a network comprising, for example, 20 users, on a bus-wide scale, a leak resistance of 600 Ω would exist between the internal unit supply potential VBATT of, for example, 12 Volt and ground. The resulting bus-wide leakage current of 20 mA could lead to a rapid discharge of a battery as the supply source.

Such a short circuit is therefore recognized by the above-mentioned function block 132 (error recognition module) of the IC 100 in each individual bus user, causing in each case the switch $S_2$ to open and switch $S_3$ to close in the function block 131. As a result the current sources 27 become operative. Their relatively low current of, for example, only 5 μA results in a buswide leakage current of only 0.1 mA in the case of 20 units. This current is negligible compared to the natural self-discharge rate of an emergency current or starter battery.

Figure 10:
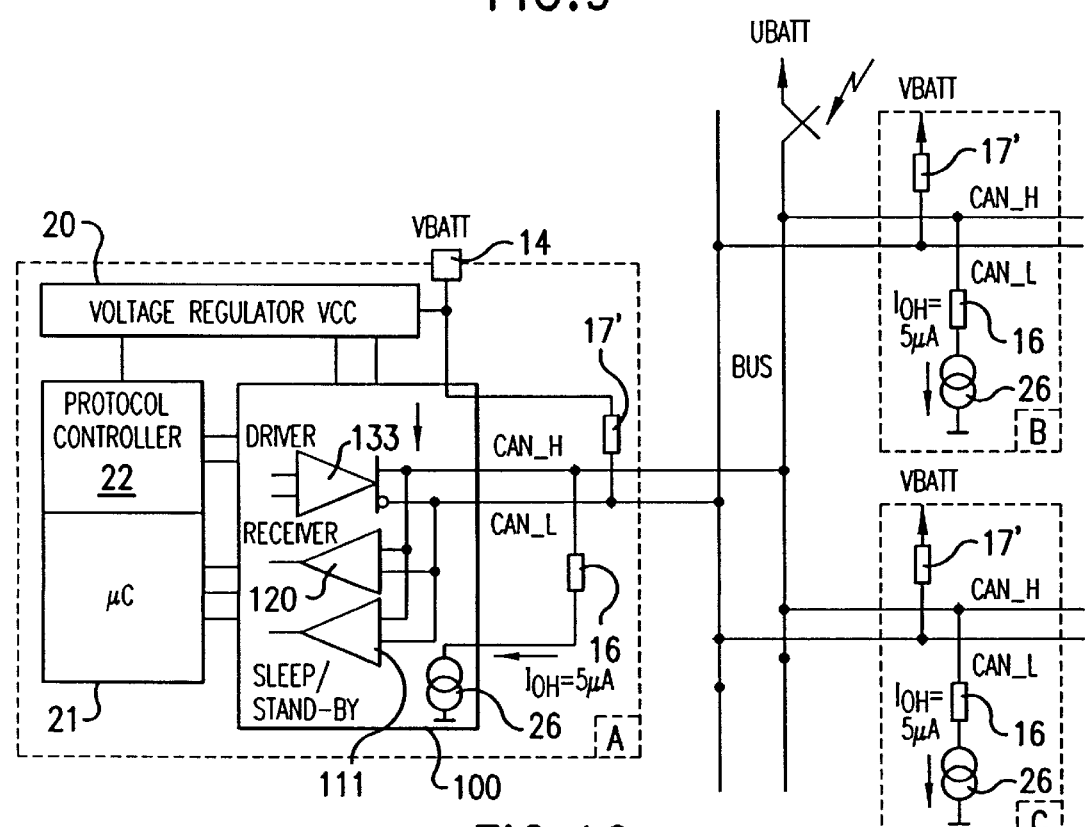
FIG. 10 is a schematic circuit diagram of a portion of the IC in a CAN network which couples it to other IC's of the same type in other bus subscribers, configured in the "SLEEP" or "STANDBY" operating mode, with a supply contact to CAN_H.

FIG. 10 illustrates the corresponding conditions in the network interconnection in the case of a short-circuit of the CAN_H bus wire with a vehicle supply rail to UBATT in the "SLEEP" or "STANDBY" operating mode (on-board supply connection). Assuming that resistor 16 has a resistance value of, for example, 600 Ω, in a network which comprises, for example, 20 users, on a bus-wide scale, a leakage resistance of 30 Ω would exist between the onboard electrical system terminal 30 (with approximately 13 Volts) and ground GND. On a bus-wide scale, such a short would therefore result in a total leakage current of 430 mA, which would lead to a still faster reduction in the battery charge required, for example, for starting the internal-combustion engine.

When such a short circuit occurs, it is recognized by the above-mentioned fault recognition module 132 of the IC 100 in each individual bus user, in each case causing the switch $S_1$ in function block 131 to open. As a result, the current sources 26 become operative, their relatively small current (for example, only 5 μA), also resulting in only negligible buswide leak current of 0.1 mA, in the case of 20 units.

In the event of a short circuit of CAN_H or CAN_L to ground GND or UBATT, with respect to the switch-over of the bus termination by the switches $S_1$ to $S_3$, it makes no difference whether the corresponding short circuit already exists when the microcontroller 21 transmits the SLEEP or STANDBY instruction to the IC 100, or whether the short circuit occurs only after the SLEEP or STANDBY operating condition has been properly reached.

The hardwired logic of the IC 100 causes the level discriminator or comparator which monitors the short-circuit-faulty bus wire within the function block 132, to be latched, and as a result of this switching operation, the (local) termination on this particular bus wire is switched over to "short circuit recognized". That is, the current source 26 or 27 (or the resistor 26' or 27') is activated.

As soon as the short circuit disappears, the corresponding, very low input current (in FIG. 3a, for example, at 8 (RTH) or 12 (CAN_L)) in the SLEEP or STANDBY operating condition, pulls the respective bus wire to a potential which is close to normal in these operating modes. As a result, the bus termination is switched-over to that which is normal in the SLEEP and STANDBY operating condition (16 and 17' operative).

Figure 11:
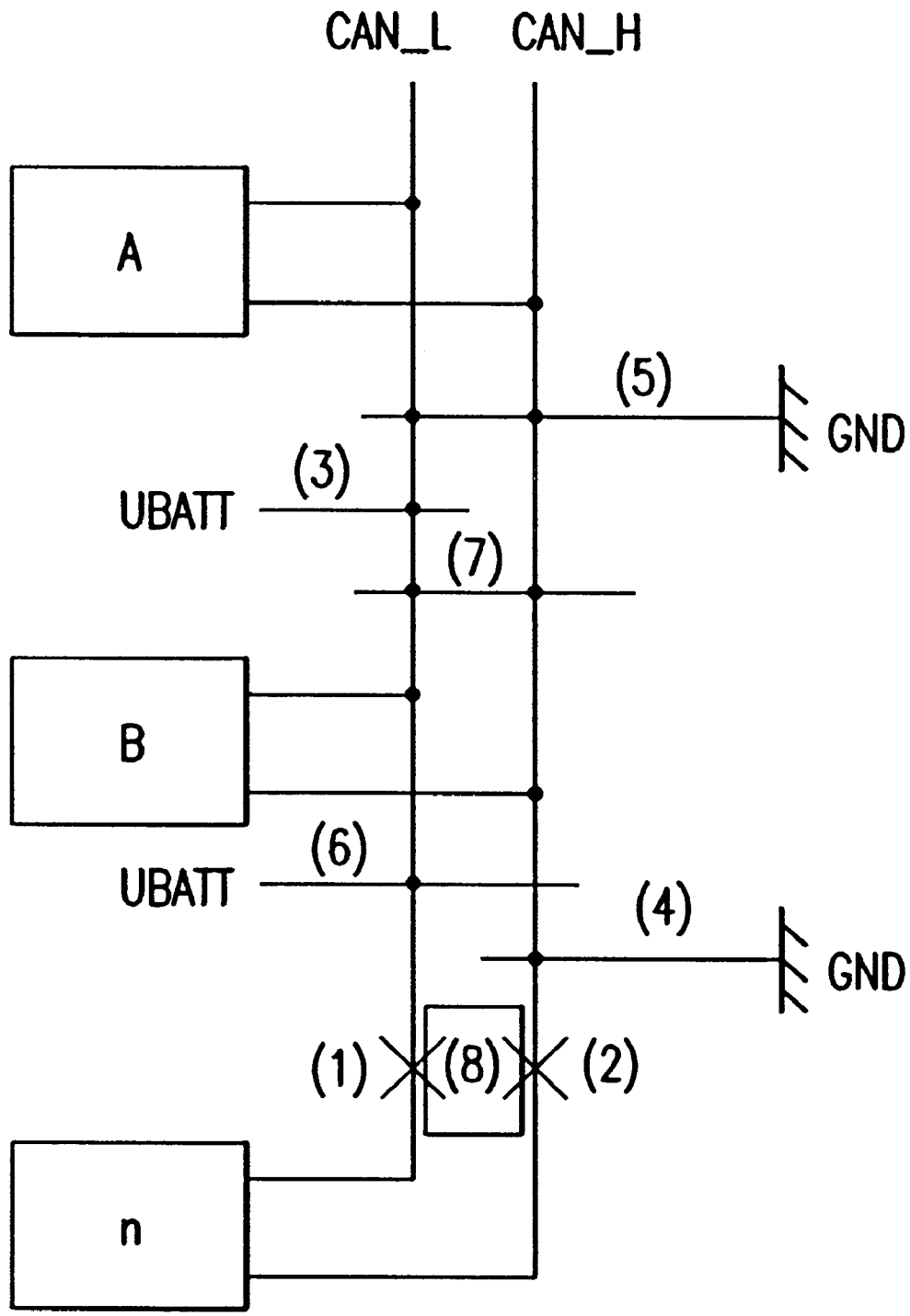
FIG. 11 is a schematic illustration of bus faults which can be recognized and remedied directly by the IC according to the invention.

For an overview, FIG. 11 compiles all fault conditions in the bus network which can be recognized by the IC 100. (The numbers in parentheses represent the bus faults.)
 (1) Interruption of CAN_L
 (2) interruption of CAN_H
 (3) supply fault on CAN_L
 (4) ground fault on CAN_H
 (5) ground fault on CAN_L
 (6) supply fault on CAN_H
 (7) short circuit between CAN_H and CAN_L
 (8) paired interruption of CAN_H and CAN_L The bus fault (8) is strictly a double fault which therefore can be recognized directly and unambiguously only by the IC 100 in the unit n (for example, for fail-safe triggering of the function which is normally controlled by this unit).

It is important that the bus error response logic, hardwired in the IC 100 in each individual bus user (so that distributed error treatment intelligence is provided throughout the network), permits the implementation of error response times on the order of a (bus)bit interval or less. In this way message losses in the course of a bus-fault-caused reconfiguration of the transmitting and receiving components of the IC 100 can be largely or completely avoided. This is an important advantage in comparison to all bus master solutions which are centrally oriented on a software basis.

Furthermore, the above-mentioned may also be implemented in the IC 100. The purpose and function of such supply monitoring are explained below, based on an environment according to FIG. 1a.

Because the voltage regulator 20 can be switched off in the SLEEP condition, the microcontroller 21 is regularly de-energized. Therefore, it is necessary to initialize the microcomputer from the zero current state as soon as the voltage regulator 20 has reset the microcontroller 21 via its PWROR output 20.4.

In the case of a motor vehicle, for example, during every new start-up the microcontroller must have access to incremental data which were valid at least during the immediately preceding operation of the motor vehicle. These data correspond to adjustment conditions, as found by the user before the new start-up, including, for example, data concerning the adjustment of adjustable seats, rear-view mirrors, etc. This is typically achieved by storing the data in an EEPROM of the microcontroller 21 and loading them into RAM of the latter at the beginning of each start-up. In this manner, stop runs for determining the current adjusting position relative to the end stops of adjustable elements, and the annoying time consumption required for this purpose, become unnecessary.

If the unit containing the microcontroller 21 is removed from a bus system in order, for example, to replace it or to insert it into another bus network, the problem occurs that the microcontroller alone cannot detect such a handling of the unit in which it is contained as the (actual) cause of a previous de-energization. Thus, after installation of the concerned unit into a new bus network, the microcontroller would continue to consider and use the data learned in the previous bus network (stored in its EEPROM) as valid data for the operation of the new bus network, leading to faulty control of the elements controlled by the unit in question.

Figure 13:
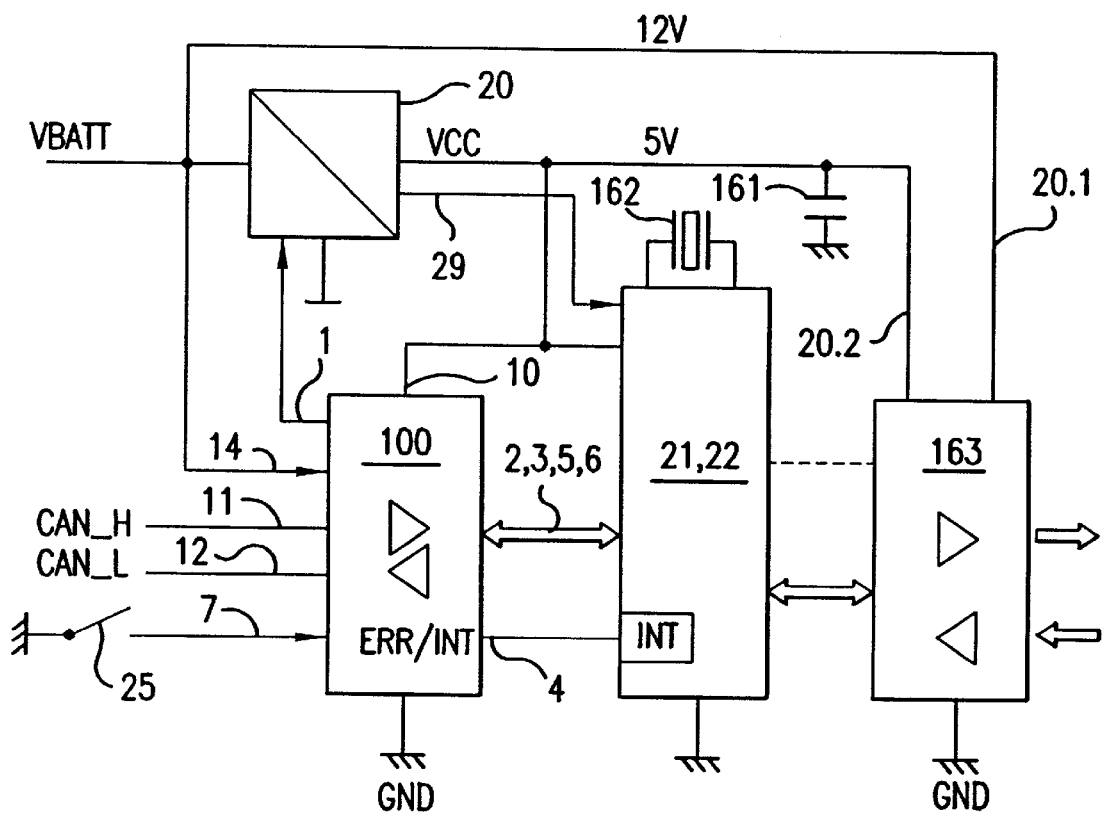
FIG. 13 is a simplified block diagram of an apparatus which is equipped with the IC and can be operated in a bus-networked manner.

This problem is remedied by the supply monitoring system integrated in the IC 100, and particularly the POWER FAIL criterion derived from the discrimination of the voltage levels VBATT and VCC in the function block 110. (The POWER FAIL criterion arrives in the control block 140 by way of path 102.) This arrangement makes use of the fact that IC 100 obtains its electric supply from the higher potential VBATT connected upstream of the regulator 20. Upon interruption of the supply from the superset potential UBATT (in the case of a vehicle, for example, by the interruption of the current supply of terminal 30), the potential VBATT collapses faster than the potential VCC, which is held by filtering and supporting capacitors 161 for certain minimum time periods, as indicated in FIG. 13.

For this purpose, in the function block 110, voltage level monitoring is carried out and analyzed, for example, according to the following pattern. Without limiting the generality, this example is based on the environment of a motor vehicle, and the voltages which occur there:

If, for example, VBATT>6V and VCC=5V, neither the microcontroller 21 nor the IC 100 are able to recognize a power failure.

In any case, the function block 110 monitors and compares VBATT (normally 12 Volts) with a limit value VL1 of, for example, 3.5 Volts. Furthermore, if the microcontroller 21 or its watchdog does not have its own power failure recognition, function block 110 also monitors and compares VCC (normally 5V) with a second limit value VL2 of, for example, 1V (the minimum voltage for dynamic data stability in the RAM of the microcontroller 21).

Within the scope of the invention, it is irrelevant whether the microswitch has its own power failure recognition for VCC. Also, it is conceivable that, for example, a separate watchdog function for the microcontroller (not described here in detail), can be provided to perform a corresponding VCC discrimination and analysis, if the one which is advantageously included in the device is not utilized, or is utilized for other purposes.

Within the scope of the invention, independently of whether the microcontroller 21 is also supported by separate auxiliary circuits (such as a watchdog-armored supply voltage monitoring system) it is possible to output at terminal 4 a POWER FAIL—INTERRUPT signal, based either on a discrimination of VBATT alone, or on a combined discrimination of VBATT and VCC. Therefore in the following, when a power failure flag of the IC 100 is discussed, this does not mean that the microcontroller 21 has no separate VCC monitoring or no auxiliary circuits for this purpose.

For example, in an engine start, when VBATT>VL1 and VCC>VL2, a power fail is recognized neither for VBATT nor for VCC, and therefore no corresponding signal is emitted at terminal 4. Therefore, at the time of a new start after a reset, the microcontroller 21 recognizes that the power failure flag is not set in the function block 145 and 143 with respect to VCC and/or VBATT, and therefore concludes that neither a new learning nor an update of incremental data from its own EEPROM is required. As a result, it continues to operate with those data currently situated in its RAM. In this case, the power failure flag is read, (as shown, for example, in FIG. 12a) in the time period between $t_8$ and $t_9$, and when it is set before the transition of the EN signal emitted by the microcontroller 21) from "L" to "H", it is recognized as an INTERRUPT signal at terminal 4. The latter is recognized as genuine by the microcontroller 21, and is interpreted as a POWER FAIL—INTERRUPT.

However, in the case of a difficult engine start, such as in the winter, the vehicle voltage UBATT may drop substantially below the initial nominal voltage for a short time (specifically below VL1). As a result, VBATT also drops by a corresponding amount while VCC is still held above VL2 after an initial energizing of the regulator 20, because of a backup capacitor 161 connected downstream of the latter. Therefore, in block 110, although the supply condition VBATT<VL1 is recognized, at the same time the supply condition VCC>VL2, which inhibits the setting of the power fail flag (inhibit) in the function block 145 or 143.

Because the power fail flag is not set, no INTERRUPT signal is output at terminal 4 (from power fail for VBATT). From the absence of this interrupt, the microcontroller 21 recognizes that neither a new learning nor an update of incremental data from the dedicated EEPROM is required, and continues to operate with the data currently situated in its RAM.

On the other hand, when an engine start has proceeded normally, but the feed potential VCC has collapsed (for example, momentarily) for whatever reasons, the situation VBATT>VL1, VCC<VL2 may occur, which can be evaluated as follows. Logic devices in the function blocks 145 and 143 prevent setting of the power fail flag in 143, and hence no INTERRUPT signal is emitted at terminal 4.

If the microcontroller 21 has its own VCC-monitoring system, or has auxiliary devices which provide such monitoring for it (that is, its own power fail flag), it will recognize, from the absence of the external POWER FAIL INTERRUPT at terminal 4 of IC 100 and the setting of its own VCC power fail flag, that re-learning of incremental data is not necessary, but that the currently applicable data must first be loaded from its EEPROM into its RAM.

The latter situation (complete collapse of the vehicle power supply, for example, because of lengthy starting attempts, so that VCC also collapses) is treated in the same manner as the removal of the battery or an interruption of the current supply from terminal 30 to the bus user in question. That is, it is treated in the same way as the removal of a corresponding unit from its bus network.

In this case, VBATT<VL1 (=3.5 Volt) and VCC<VL2 (=1 Volt). These two conditions cause the power fail flag to be set in function block 145 and 143, and a POWER FAIL INTERRUPT signal to be generated at terminal 4 of IC 100. In addition, the power fail flag of the microcontroller is also set with respect to VCC. This state and the POWER FAIL— INTERRUPT signal are evaluated by the microcontroller 21 as an indication that the continuously current-supplied terminal 30 has been disconnected and reconnected. This causes the microcontroller, during the new start, to learn end stops and the relative position(s) of the elements controlled by it, and store them in its EEPROM.

Since specifically in the SLEEP mode VCC=0 Volt, the microcontroller can always recognize a power failure with respect to VCC from this condition. Thus, a determination of whether the electronic unit containing the microcontroller 21 (and the device according to the invention) has been cut off from its current supply in the SLEEP mode depends essentially on the power fail recognition with respect to VBATT in function block 145 and 143, which is achieved by the device in the manner described above.

By appropriate dimensioning of backup capacitors for VCC, or supply potentials of digital circuit functions derived therefrom in conjunction with the microcontroller, it is possible, for example, to satisfy the requirement that the system be capable of enduring an interruption of the supply potential UBATT lasting, for example, 1.5 seconds, without loss of data and power fail recognition with respect to VCC. On the other hand, after an interruption of, for example, at least 30 seconds, a new learn cycle with respect to the data to be incrementally stored on end stops must be initiated during the new start of the microcontroller.

With regard to the possible functions of blocks 110 and 143, the scope of the invention is not limited to the above-mentioned examples of supply monitoring, and other systems may also be expedient which differ from the above. In particular, if the IC may have a larger number of connections (as, for example, in the case of integration as a standard cell), it may also have additional inputs for the selection of different fixed programmed supply monitoring modes which can be selected according to the selection circuitry or control.

In connection with such a supply monitoring, the above-mentioned mandatory disconnection of the transmission output stage 133 can be provided, so that the output stage 133 is disconnected from CAN_H/CAN_L when the potential VBATT and/or VCC falls below a predetermined threshold value, thereby avoiding a burden which impairs the function of the bus. This aspect is represented by the connection 157 in FIG. 2.

The invention also includes the monitoring of any other voltage which can be integrated in block 110, depending on the application for the function of the IC 100 or the environment into which it is to be linked. An example of such a voltage would be a control voltage from a switching regulator for control units with a higher operating voltage UBATT, for example, in utility vehicles. Such monitoring includes not only drops of the voltage below a lower limit, but also its exceeding an upper limit or exceeding a voltage window. The analysis to an ERR/INT signal at terminal 4 in this case can also take place in the function block 145.

Figure 12B:
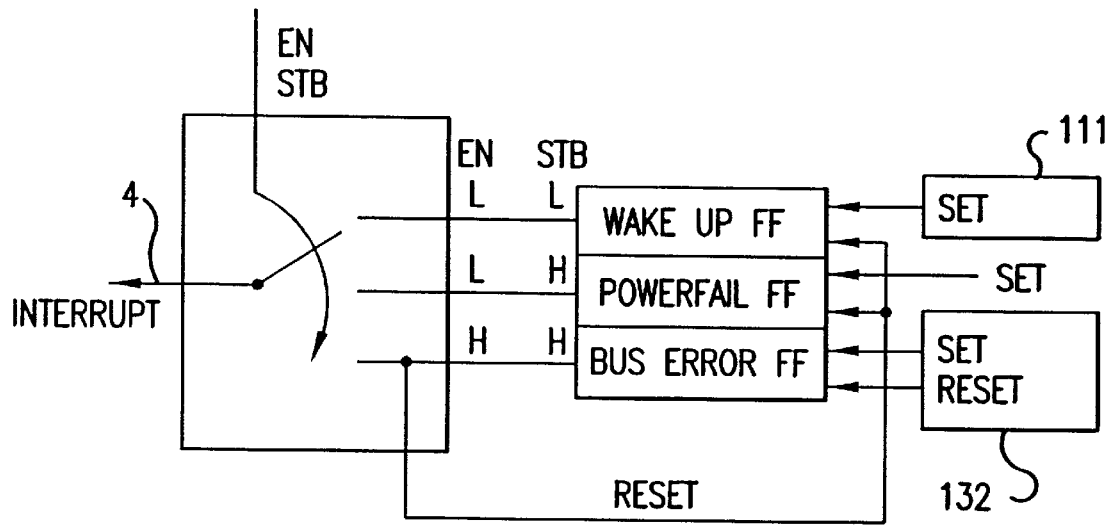
FIG. 12b is a simplified block diagram which illustrates the analysis of the INTERRUPT signal of the IC which differs as a function of the operating mode.

FIG. 12 is a timing diagram that shows the important voltage and signal levels which illustrate the operation of a control unit with the IC 100 in the configuration according to FIG. 1a, for example, as a function of the operating mode, after the application of the supply/feed potential UBATT/VBATT. It also shows how the microcontroller responds to the ERR/INT signal, which is to be interpreted here. FIG. 12b is a function diagram, which illustrates the operation described in connection with FIG. 12a.

At the time $t_3$, the device is connected to UBATT or VBATT. After a short delay, at the point in time $t_4$ the IC 100 emits the ENA/NINH signal at the control output 1, to the control input 20.3 of the regulator 20, whereupon, the feed voltage VCC of the microcontroller 21 builds up until the point of time $T_5$. Thereafter, at time $t_6$, the voltage regulator 20 emits the PWROR signal to reset the microcontroller 21 for initialization.

To ensure this reaction, the IC 100 (in particular its function block 110) may cause the ENA/NINH signal to be initially generated first of all independently of the logic status of the EN and STB inputs when input 14 is acted upon by VBATT at the start of operation (switching-on of a control unit with the IC 100 and the voltage regulator to UBATT). In this manner, it is possible to energize the microcontroller 21 for the purpose of reading-in of its EN and STB signals, which then control the operating state of the IC 100 (Latchup to Go).

The ERR/INT signal output at terminal 4 is then evaluated by the microcontroller 21 as a function of the logic level of the STB an EN signals emitted by the microcontroller, and (since the latter signals indicate the operating mode of the IC) as a function of its SLEEP, STANDBY/RECEIVE ONLY and NORMAL operating modes, as follows.

By the time period $t_7$, the microcontroller 21 has safely concluded its initialization together with the port check. During a following time period (the so-called POWER-ON PHASE) between $T_7$ and $T_8$, both signals STB and EN on the part of the microcontroller still have the logic level "L" corresponding to an adjustment of the IC 100 to the SLEEP mode. If, in this logic state, a wakeup signal is recognized, for example, via the switch 25 on 7, the wakeup flag is set in function blocks 145 and 143. In the state, before the STB signal changes from "L" to "H", this leads to the triggering of an INTERRUPT signal at terminal 4 (that is, in the first signal window for ERR/INT). The latter signal in this time period as interpreted by the microcontroller 21 is a WAKEUP INTERRUPT. The upper switch position in FIG. 12b for querying the wakeup flipflop in block 145 and 143 corresponds to this case.

In at least one portion of the POWER-ON PHASE, preferably the bus error recognition 132 can remain inactive, by means of devices which are actuated, for example, by the rising edge VCC on connection 10 of the IC 100.

During the following time period between $t_8$ and $t_9$ (the so-called RECEIVE ONLY PHASE), the microcontroller emits STB="H", EN="L". If the power fail flag was previously set, or is set in block 145 and/or 143, in this logic state before the EN signal of "L" changes over to "H", this causes the triggering of an INTERRUPT signal at terminal 4 (that is, in the second signal window for ERR/INT), which in this time period is interpreted by the microcontroller 21 as POWER FAIL INTERRUPT. The center switch position for querying the power fail flipflop in block 145 and/or 143 in FIG. 12b corresponds to this case.

At time $t_9$, the full communication capacity is established and the microcontroller emits EN="H", STB="H". If the bus error flag was previously set or is set in the bus error evaluation block 144 and/or in 143, in this logic condition, an INTERRUPT signal is triggered at terminal 4 (that is, in the third signal window for ERR/INT). The latter signal starting at the point in time $t_9$, is interpreted by the microcontroller 21 as a BUS FAULT INTERRUPT. The lower switch position for querying the bus error flipflop in block 144 and/or 143 in FIG. 12b corresponds to this case.

FIG. 12b also illustrates the resetting of the wake-up flag and of the power fail flag, which is done as a function of signals EN and STB when EN="H" and STB="H". As a result, it is ensured that, after a subsequent transition into the SLEEP operating mode (EN="L", STB="L") in the case of a new wakeup, the flag register is again initial and can therefore be set.

An electronic control unit, which comprises the IC according to the invention, can roughly have an overall block diagram according to FIG. 13. In addition to the parts already mentioned, there are also provided a central support capacitor 161 for the potential VCC at the regulator output 20.2, a circuit element 162 for determining the clock frequency of the microcontroller 21 and, as an interface between sensors (and actuators) and the microcontroller 21 with the bus protocol module 22, an input/output interface 163 which is supplied with current from VCC as well as from VBATT. This illustration shows that the IC 100 can also be considered as an interface between CAN_H/CAN_L and microcontroller 21 and the bus protocol module, both in terms of its above-described functions as well as its arrangement in the communication path.

It is important to note that the IC 100 (and particularly its transmitting output stage 133) can be inherently protected against all possible bus errors. Moreover, within the scope of the function block 130, because of the function blocks 131 and 132, in the event of a fault, bus operation for the purpose of maintaining a communication functionality is achieved purely by means of the hardware, except for the microcontroller itself. As the result, both the microcontroller and the bus protocol function assigned to it can be switched off completely.

This characteristic is also supported by an optional design of the transmitting devices 130 (or at least the output stage 133 comprised by them) so that when a defect is present in the IC 100, they are automatically disconnected from the bus. Thus, blocking of the bus network by a unit which experiences such a disturbance is avoided.

For completeness, it should also be mentioned that the elements of the IC 100 which, in the case of an error, identify the best viable possibility for emergency communication by way of the bus, and adjust, reconfigure or adapt the transmitting and receiving devices, can operate on the basis of analog comparisons of the bus wire potentials with fixed tolerance windows for these potentials.

If the IC is manufactured in a robust technology which, in particular, can withstand high voltages which are encountered in the particular application field, and is also compatible with electromagnetic interference expected there (for example, no reference level shift by HF rectifying effects in/with the case of comparators in blocks 121 and 132, etc.), it also provides a physical safety interface, in the manner of a protective wall in front of the microcontroller, for highly sensitive switching elements, such as analog-to-digital converters and digital circuits of a control apparatus.

In such an implementation, the IC can also comprise special, co-integrated devices which replace the external protection devices which are otherwise required in order to make the receiving and transmitting devices on the bus resistant to external short-circuit and error conditions possible on a bus-wide scale.

Without limiting the generality, the IC 100 according to FIG. 2 in this respect may also comprise filter elements, particularly with a low-pass characteristic. For example, such a filter element 80 may be arranged between terminal 7 and the function block 111 (WAKEUP logic). Corresponding filter elements 81 may be arranged in the joint bus connection path CAN_H/CAN_L of the function blocks 111 and 132. Other filter elements 82 may be arranged in the bus connection path of the connections 11 and 12 to the receiver front end 121.

Such filter elements increase the signal-to-noise ratio and reduce the response sensitivity of the IC 100 to high-frequency interference, including those high-frequency interfering signals which affect the useful (emergency) signal, in the event of single-wire operation by way of the ground GND in the path of the ground contact, due to a bus fault. In the simplest case, these may be analog RC low pass filters whose elements in the IC 100 are distributed circuit-topologically. They may also be quasi-digital filters, for example, those with a predetermined response time on the order of several bus bit lengths. On the other hand, such filter elements 80, 81 and 82 may also be implemented in different ways, and may have different characteristics, so as to take into account, for example, different interference possibilities in the SLEEP and NORMAL operating modes, with and without errors or the fast bus error recognition and treatment within a very short time.

Figure 14:
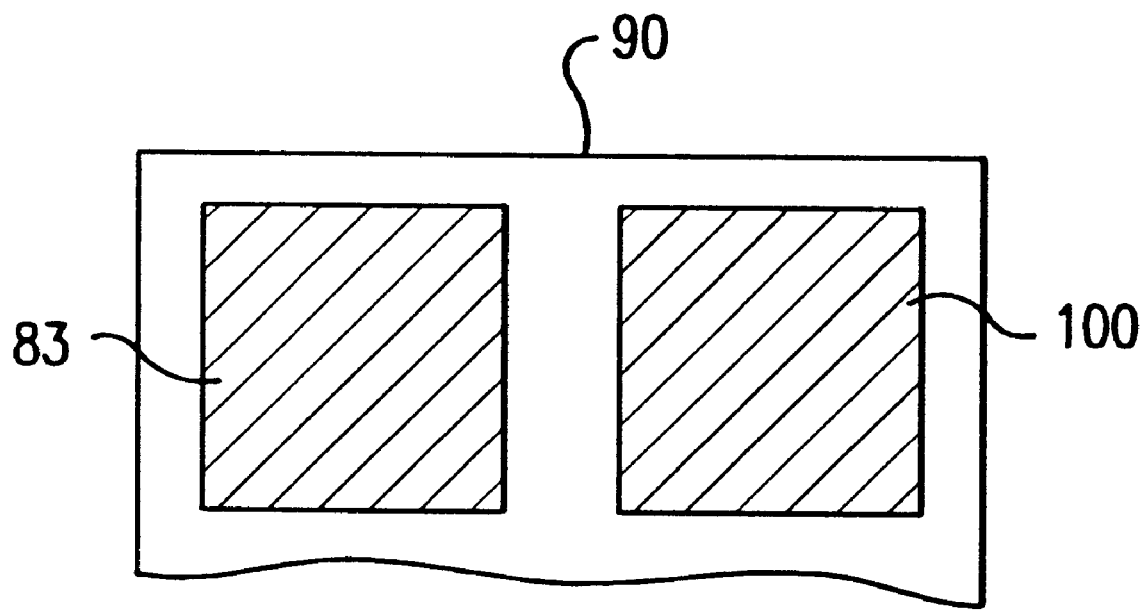
FIG. 14 is a schematic illustration of the monolithic implementation of the IC together with other circuit functions in the sense of a large-scale integration.

Within the scope of the invention, the IC 100 according to FIG. 14 may also be implemented together with another arbitrary circuit function 83, on a single semiconductor substrate 90. To this extent both in each case have a monolithic construction.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Integrated semiconductor circuit for an electronic control unit having a microcontroller with a bus protocol function and being coupled in communication with other control units, each having a microcontroller with a bus protocol function, by way of a two wire bus to form a Controller Area Network (CAN) in which bus communication takes place serially in a protocol-based manner, by means of alternative communication modes, said semiconductor circuit comprising:

a receiving device having two inputs for connection to wires of the two wire bus and an output for connection to a receiving input of the bus protocol function;

a transmitting device having an input for connection to a transmitting output of the bus protocol function and two outputs for connection to the wires of the two wire bus;

each of said transmitting and receiving devices having a configuration which is variable to implement different communication modes via said two wire bus;

means operative upon occurrence of a bus fault which impairs normal bus communication via both bus wires, for adjusting the receiving device and the transmitting device to implement a best still viable mode for emergency bus communication;

a bus fault recognition device for detecting occurrence of a bus fault;

a bus fault analysis device responsive to information from said bus fault recognition device for preparing and outputting at least one error or interruption signal for supply to the microcontroller;

first and second termination elements; and a bus termination switching device having a configuration which can be varied in response to information from said bus fault recognition device for selectively connecting said first and second termination elements to respective ones of said two bus wires.

2. Integrated semiconductor circuit according to claim 1 further comprising:

an input for ground;

a first supply input for a higher operating voltage; and a second supply input for a lower operating voltage.

3. Integrated semiconductor circuit according to claim 1 wherein said bus termination switching device comprises first and second alternate termination elements integrated therein, and at least a switch for connecting at least one of said alternate termination elements to a wire of said two wire bus as a function of a type of recognized bus fault.

4. Integrated semiconductor circuit according to claim 3, wherein the first alternate termination element comprises an impressed current source.

5. Integrated semiconductor circuit according to claim 3 wherein the first alternate termination element comprises a high-ohmic resistor.

6. Integrated semiconductor circuit according to claim 3, wherein the second alternate termination element comprises an impressed current source.

7. Integrated semiconductor circuit according to claim 3, wherein the second alternate termination element comprises a high-ohmic resistor.

8. Integrated semiconductor circuit according to claim 2, wherein the first termination element is connected to the higher operating voltage.

9. Integrated semiconductor circuit according to claim 1, wherein the means for adjusting the receiving device are assigned respectively to the receiving device and the transmitting device, whereby the receiving device is autonomically self-adjusting independently of the transmitting device.

10. Integrated semiconductor circuit according to claim 9, wherein said adjustment takes place within a bus-bit interval.

11. Integrated semiconductor according to claim 9, wherein said adjustment takes place without bus message losses.

12. Integrated semiconductor circuit according to claim 1, further comprising a wakeup recognition device, wherein:
outputs of the bus fault analysis device and the wakeup recognition device are logically linked to generate an error/interruption signal which is supplied to the microcontroller.

13. Integrated semiconductor circuit according to claim 2, wherein when the higher operating voltage drops below a predetermined limit value, the transmitting device is automatically disconnected from the bus.

14. Integrated semiconductor circuit according to claim 2, wherein when the lower operating voltage drops below a predetermined limit value, the transmitting device is automatically disconnected from the bus.

15. Integrated semiconductor circuit according to claim 13, wherein said disconnection takes place by blocking a control input for active connection of the transmitting device to the two wire bus.

16. Integrated semiconductor circuit according to claim 1, further comprising a device which blocks a current supply to the transmitting device as a function of detected faults.

17. Integrated semiconductor circuit according to claim 1, further comprising a device which blocks a current supply to the transmitting device upon recognition of an intrinsic error of the semiconductor circuit.

18. Integrated semiconductor circuit according to claim 16, wherein blocking of the current supply to the transmitting devices causes them to be disconnected from the bus.

19. Integrated semiconductor circuit according to claim 1, further comprising:
a monitoring device for detecting a voltage drop below, or an increase which exceeds, predetermined limit values; and
an analysis device for generating and sending at least one error/interruption signal to the microcontroller in response to information from said monitoring device.

20. Integrated semiconductor circuit according to claim 2, further comprising
a monitoring device for detecting a failure of a voltage supplied to said semiconductor circuit, by monitoring the higher operating voltage to detect drops below a first limit value; and
an analysis device for the generating and sending at least one error/interruption signal to the microcontroller in response to information from the monitoring device.

21. Integrated semiconductor circuit according to claim 20, wherein
said monitoring device also monitors the lower operating voltage of the microcontroller to detect a drop below a second limit value; and
said analysis device generates and sends of at least an error/interruption signal to the microcontroller when said operating voltage drops below said limit value.

22. Integrated semiconductor circuit according to claim 21, further comprising a logic device which generates an error/interruption signal in response to a drop of said voltages below both limit values.

23. Integrated semiconductor circuit according to claim 1, further comprising a monitoring device for detecting a failure of a voltage supply for said integrated circuit in response to a drop of a first supply voltage for said semiconductor circuit below a first limit value, wherein:
outputs of the bus error analysis device and the monitoring device are logically linked to control and send an error/interruption signal to the microcontroller.

24. Integrated semiconductor circuit according to claim 23, wherein said monitoring device also detects a drop of a second supply voltage for said semiconductor circuit below a second limit value, wherein the bus error analysis device and the monitoring device generate and send an error/interruption signal to the microcontroller.

25. Integrated semiconductor circuit according to claim 1, further comprising filter elements which are switched so that one of them is operative at least between one bus wire and a corresponding one of two inputs of the receiving device or the bus fault recognition device.

26. Integrated semiconductor circuit according to claim 1, wherein the receiving device and transmitting device are constructed without external protective wiring in a nondestructive manner, error-tolerant with respect to possible errors bus-wide.

27. Integrated semiconductor circuit according to claim 1, which is monolithically integrated.

28. Integrated semiconductor circuit according to claim 27, which is monolithically integrated on a semiconductor substrate together with another semiconductor circuit function.

29. Integrated semiconductor circuit according to claim 27, which is integrated on a semiconductor chip, and is designed as a compilable standard cell.

30. Integrated semiconductor circuit for an electronic control unit having a microcontroller with a bus protocol function and being coupled in communication with other control units, each having a microcontroller with a bus protocol function, by way of a two wire bus to form a Controller Area Network (CAN) in which bus communication takes place serially in a protocol-based manner by means of alternative communication modes, wherein:
said semiconductor circuit has at least two different operating modes, a transmitting and receiving NORMAL mode and a dormant SLEEP mode, and comprises
a receiving device having two inputs connected to wires of the two wire bus and an output for the connection to a reception input of the bus protocol function;
a transmitting device having an input for connection to a transmitting output of the bus protocol function and two outputs connected to the wires of the two wire bus;
an input for reception of at least one selection signal from the microcontroller for selection of one of said operating modes;
an input for the reception of locally generated local wakeup signal;
a wakeup recognition device connected with the two wire bus and with the input for reception of a wakeup signal;
a switching device for providing a switching signal; and a wakeup analysis device for generating and sending to the microcontroller an error/interruption signal when said semiconductor circuit is in the "SLEEP" operating mode and a wakeup signal is recognized by the wakeup recognition device from said bus or from said input for reception of a local wakeup signal.

31. Integrated semiconductor circuit according to claim 30 further comprising:

an input for ground;

a first supply input for a higher operating voltage; and a second supply input for a lower operating voltage.

32. Integrated semiconductor circuit according to claim 31 wherein:

in the "SLEEP" operating mode, the supply input for the lower operating voltage is not energized.

33. Integrated semiconductor circuit according to claim 30, further comprising a bus termination switching device which causes a termination of the wires of the two wire bus by means of impedances which are asymmetrical with respect to a ground input of the semiconductor circuit, when said semiconductor circuit is in the "SLEEP" mode.

34. Integrated semiconductor circuit according to claim 33, wherein in the "NORMAL" mode, the bus termination switching device selectively connects first and second identical termination elements to the wires of the two wire bus; and in the "SLEEP" mode, the bus termination switching device connects at least a first alternate termination element integrated in the semiconductor circuit to a corresponding bus wire.

35. Integrated semiconductor circuit according to claim 34, wherein the identical termination elements are connected as external circuit elements discretely to the semiconductor circuit.

36. Integrated semiconductor circuit according to claim 34, wherein the first identical termination element and the alternate termination element are resistors, said first alternate termination element having a resistance which is much larger than a resistance of the first identical termination element.

37. Integrated semiconductor circuit according to claim 34, further comprising:

a bus fault recognition device which detects at least one bus fault which has an effect in the "SLEEP" operating mode, said bus fault recognition device causing the bus termination switching device to disconnect the first integrated alternate termination element, and to connect at least one second alternate termination element to the bus.

38. Integrated semiconductor element according to claim 37, wherein:

the second alternate termination element is dimensioned relative to the first integrated alternate termination element so that, in the case of a fault, a lower current flows through the second alternate termination element then flows through the first integrated alternate termination element in the absence of an error.

39. Integrated semiconductor circuit according to claim 30, further having at least one of two additional operating modes, a reception only RECEIVE ONLY mode, and a readiness STANDBY mode, in which either the current supply of the transmitting device can be switched off or the transmitting device can be disconnected from the bus.

40. Integrated semiconductor circuit according to claim 30, further comprising a device which blocks a current supply to the transmitting device as a function of detected faults.

41. Integrated semiconductor circuit according to claim 30, further comprising a device which blocks a current supply to the transmitting device in the "SLEEP" mode.

42. Integrated semiconductor circuit according to claim 30, further comprising a device which blocks a current supply to the transmitting device upon recognition of an intrinsic error of the semiconductor circuit.

43. Integrated semiconductor circuit according to claim 30, further comprising filter elements which are switched so that one of them is operative at least between one bus wire and a corresponding one of two inputs of the receiving device or the wakeup recognition device.

44. Integrated semiconductor circuit according to claim 30, further comprising at least one filter element which is connected between an input for a wakeup signal and a wakeup recognition device.

* * * * *